(12) United States Patent
Saito et al.

(10) Patent No.: US 12,322,415 B2
(45) Date of Patent: Jun. 3, 2025

(54) TAPE REEL WITH REEL HUB HAVING EXPANDING OUTER PERIPHERAL REGIONS, TAPE CARTRIDGE, AND APPARATUS FOR PRODUCING TAPE REEL

(71) Applicant: Sony Group Corporation, Tokyo (JP)

(72) Inventors: Takeshi Saito, Tokyo (JP); Tatsuo Suzuki, Tokyo (JP)

(73) Assignee: Sony Group Corporation, Tokyo (JP)

( * ) Notice: Subject to any disclaimer, the term of this patent is extended or adjusted under 35 U.S.C. 154(b) by 0 days.

(21) Appl. No.: 18/281,714

(22) PCT Filed: Feb. 9, 2022

(86) PCT No.: PCT/JP2022/005104
§ 371 (c)(1),
(2) Date: Sep. 12, 2023

(87) PCT Pub. No.: WO2022/196194
PCT Pub. Date: Sep. 22, 2022

(65) Prior Publication Data
US 2024/0161781 A1    May 16, 2024

(30) Foreign Application Priority Data
Mar. 17, 2021    (JP) .................. 2021-043930

(51) Int. Cl.
*G11B 23/037*    (2006.01)
*G11B 5/78*    (2006.01)
(Continued)

(52) U.S. Cl.
CPC .............. *G11B 23/037* (2013.01); *G11B 5/78* (2013.01); *G11B 15/32* (2013.01); *G11B 23/107* (2013.01)

(58) Field of Classification Search
None
See application file for complete search history.

(56) References Cited

U.S. PATENT DOCUMENTS

| | | | | |
|---|---|---|---|---|
| 3,796,387 A | * | 3/1974 | Zielke | G11B 23/037 242/326.3 |
| 2004/0021024 A1 | * | 2/2004 | Yoshimura et al. | G11B 23/107 242/348 |

(Continued)

FOREIGN PATENT DOCUMENTS

| | | |
|---|---|---|
| JP | 2007066466 A | 3/2007 |
| JP | 2008243294 A | 10/2008 |

(Continued)

OTHER PUBLICATIONS

International Search Report from corresponding PCT application PCT/JP2022/005104, dated Apr. 19, 2022, 2 pages.

*Primary Examiner* — Craig A. Renner
(74) *Attorney, Agent, or Firm* — K&L Gates LLP

(57) ABSTRACT

A tape reel includes: a first flange; a second flange; and a reel hub. The reel hub includes a first end portion formed integrally with the first flange, a second end portion to which the second flange is bonded, and an outer peripheral surface on which a magnetic tape is wound. The outer peripheral surface of the reel hub has a first outer peripheral region and a second outer peripheral region. The first outer peripheral region expands in diameter from the first end portion toward the second end portion. The second outer peripheral region expands in diameter from the first outer peripheral region across the second end portion and forms a ridge line portion having a shape projecting radially outward of the hub portion on a boundary between the second outer peripheral region and the first outer peripheral region.

13 Claims, 9 Drawing Sheets

(51) Int. Cl.
*G11B 15/32* (2006.01)
*G11B 23/107* (2006.01)

(56) References Cited

U.S. PATENT DOCUMENTS

| | | | |
|---|---|---|---|
| 2006/0043227 A1* | 3/2006 | Iino et al. | G11B 23/107 |
| | | | 242/348 |
| 2008/0223971 A1* | 9/2008 | Shiga | G11B 23/107 |
| | | | 242/348.2 |
| 2008/0237382 A1 | 10/2008 | Shiga | |
| 2008/0265078 A1 | 10/2008 | Shiga | |
| 2009/0045279 A1 | 2/2009 | Ishikawa | |
| 2018/0061448 A1* | 3/2018 | Cherubini et al. | G11B 15/32 |
| 2022/0172743 A1 | 6/2022 | Kumagai et al. | |

FOREIGN PATENT DOCUMENTS

| | | | | |
|---|---|---|---|---|
| JP | 2008276868 A | 11/2008 | | |
| JP | 2009048692 A | 3/2009 | | |
| WO | WO-2020202980 A1 * | 10/2020 | | G11B 23/107 |

* cited by examiner

TAPE REEL WITH REEL HUB HAVING EXPANDING OUTER PERIPHERAL REGIONS, TAPE CARTRIDGE, AND APPARATUS FOR PRODUCING TAPE REEL

TECHNICAL FIELD

The present technology relates to a tape reel that includes a reel hub having a cylindrical shape, a tape cartridge including the same, and an apparatus for producing the tape reel.

BACKGROUND ART

As a magnetic tape cartridge used as an external recording medium of a computer or the like, those rotatably housing a single tape reel on which a magnetic tape is wound in a cartridge case have been known. The tape reel includes a cylindrical reel hub on which the magnetic tape is wound and an upper flange and a lower flange disposed at both ends of the reel hub. A general tape reel includes a lower flange formed integrally with a reel hub and an upper flange fixed to an upper end of the reel hub by ultrasonic bonding or the like.

As the recording capacity of the tape cartridge has increased in recent years, the thickness of the magnetic tape has been reduced, the tape length has increased, and thus, the tightening (winding pressure) of the magnetic tape applied to the reel hub tends to increase. Further, the winding pressure to be applied to the reel hub further increases due to the influence of long-term preservation of the tape cartridge under high-temperature and high-humidity environments, and thus, the amount of deformation of the reel hub tends to increase more and more.

For example, in a reel structure in which the reel hub is molded integrally with the lower flange, when the upper end portion of the reel hub fixed to the upper flange deforms so as to fall inward, the difference in outer diameter between both end portions of the reel hub increases. As a result, there is a possibility that the lower edge portion of the magnetic tape facing the lower flange deforms to be longer than the upper edge of the magnetic tape facing the upper flange and this deteriorate the recording and reproduction properties of the magnetic tape.

In order to solve such a problem, for example, the following Patent Literature 1 discloses a tape reel that includes a hub around which a recording tape is wound and flanges provided at both end portions of the hub, a large-diameter portion being formed in the hub, the large-diameter portion having a diameter larger than the diameter of each of both ends of the hub.

Further, the following Patent Literature 2 discloses a tape reel in which a cylindrical reinforcing ring is attached to a hub formed in a cylindrical shape and the outer peripheral surface of the hub is tapered such that the outer diameter of the hub increases from the lower end portion of the hub to the upper end portion of the hub.

CITATION LIST

Patent Literature

Patent Literature 1: Japanese Patent Application Laid-open No. 2008-243294
Patent Literature 2: Japanese Patent Application Laid-open No. 2009-48692

DISCLOSURE OF INVENTION

Technical Problem

However, in the structure described in Patent Literature 1, deformation of the central region of the tape wound around the large-diameter portion of the outer peripheral surface of the hub causes a problem in some cases. For example, since shrinkage stress applied to the tape increases in high-temperature and high-humidity preservation environments, there is a possibility that the central region of the magnetic tape wound around the large-diameter portion of the outer peripheral surface of the hub deforms excessively as compared with the tape edge portion, which adversely affects the stable recording and reproduction properties.

Further, in the structure described in Patent Literature 2, the taper shape of the outer peripheral surface of the hub is formed such that the inclination angle with respect to the lower flange gradually increases from the lower end portion to the upper end portion of the hub. For this reason, in the case where the reel hub is molded integrally with the lower flange, there are production disadvantages such as difficulty in providing the draft angle of the mold for molding the outer peripheral surface of the reel hub.

In view of the circumstances as described above, it is an object of the present technology to provide a tape reel capable of suppressing deformation of a reel hub caused by tightening of a magnetic tape and preservation environment, a tape cartridge including the same, and an apparatus for producing the tape reel.

Solution to Problem

A tape reel according to an embodiment of the present technology includes: a first flange; a second flange; and a reel hub having a cylindrical shape.

The reel hub includes a first end portion formed integrally with the first flange, a second end portion to which the second flange is bonded, and an outer peripheral surface on which a magnetic tape is wound.

The outer peripheral surface of the reel hub has a first outer peripheral region and a second outer peripheral region.

The first outer peripheral region expands in diameter from the first end portion toward the second end portion.

The second outer peripheral region expands in diameter from the first outer peripheral region across the second end portion and forms a ridge line portion having a shape projecting radially outward of the hub portion on a boundary between the second outer peripheral region and the first outer peripheral region.

A tape cartridge according to an embodiment of the present technology includes: a tape reel that includes a first flange, a second flange, and a reel hub that has a cylindrical shape and includes a first end portion to be connected to the first flange, a second end portion to be connected to the second flange, and an outer peripheral surface on which a magnetic tape is wound.

The outer peripheral surface of the reel hub has
  a first outer peripheral region expanding in diameter from the first end portion toward the second end portion, and
  a second outer peripheral region expanding in diameter from the first outer peripheral region across the second end portion and forming a ridge line portion having a shape projecting radially outward of the reel hub on a boundary between the second outer peripheral region and the first outer peripheral region.

An apparatus for producing a tape reel according to an embodiment of the present technology includes: a first mold for molding an outer peripheral surface of the reel hub; and a second mold for molding an inner peripheral surface of the reel hub.

The first mold has a first molding surface configured by a tapered surface forming the first outer peripheral region and a second molding surface configured by a cylindrical surface forming the second outer peripheral region.

MODE(S) FOR CARRYING OUT THE INVENTION

Hereinafter, an embodiment according to the present technology will be described with reference to the drawings.

Figure 1:
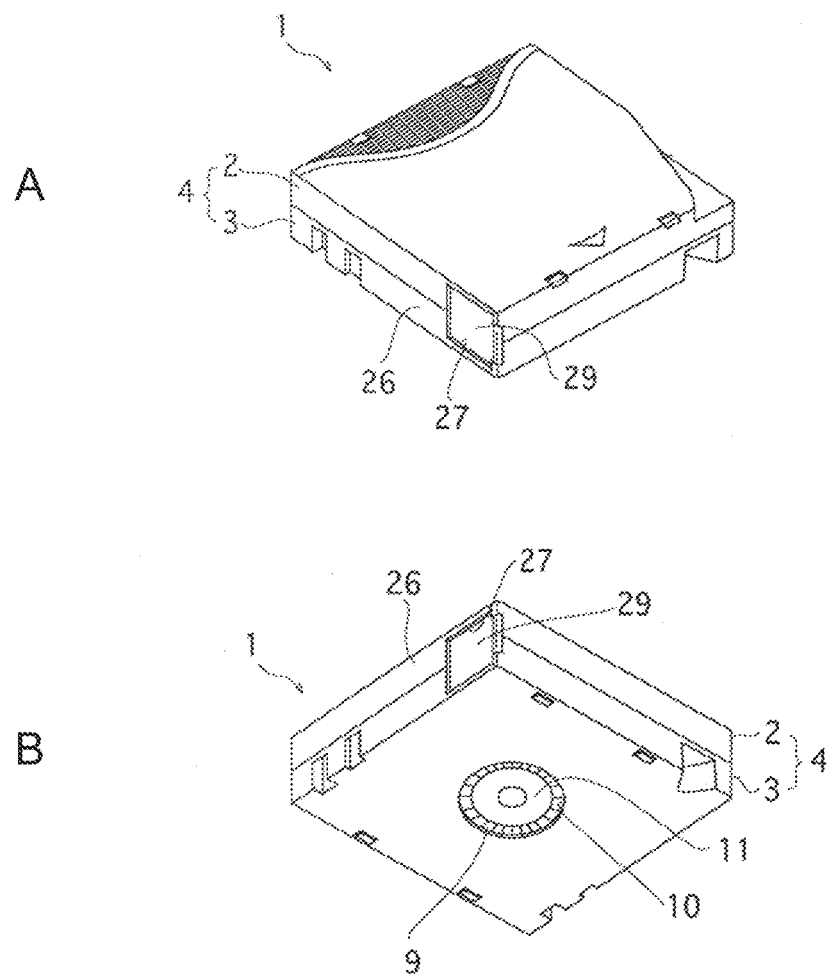
FIG. 1 is a perspective view of an entire tape cartridge 1 according to an embodiment of the present technology, Part A being a perspective view when viewed from the upper surface side, Part B being perspective view when viewed from the lower surface side.
Figure 2:
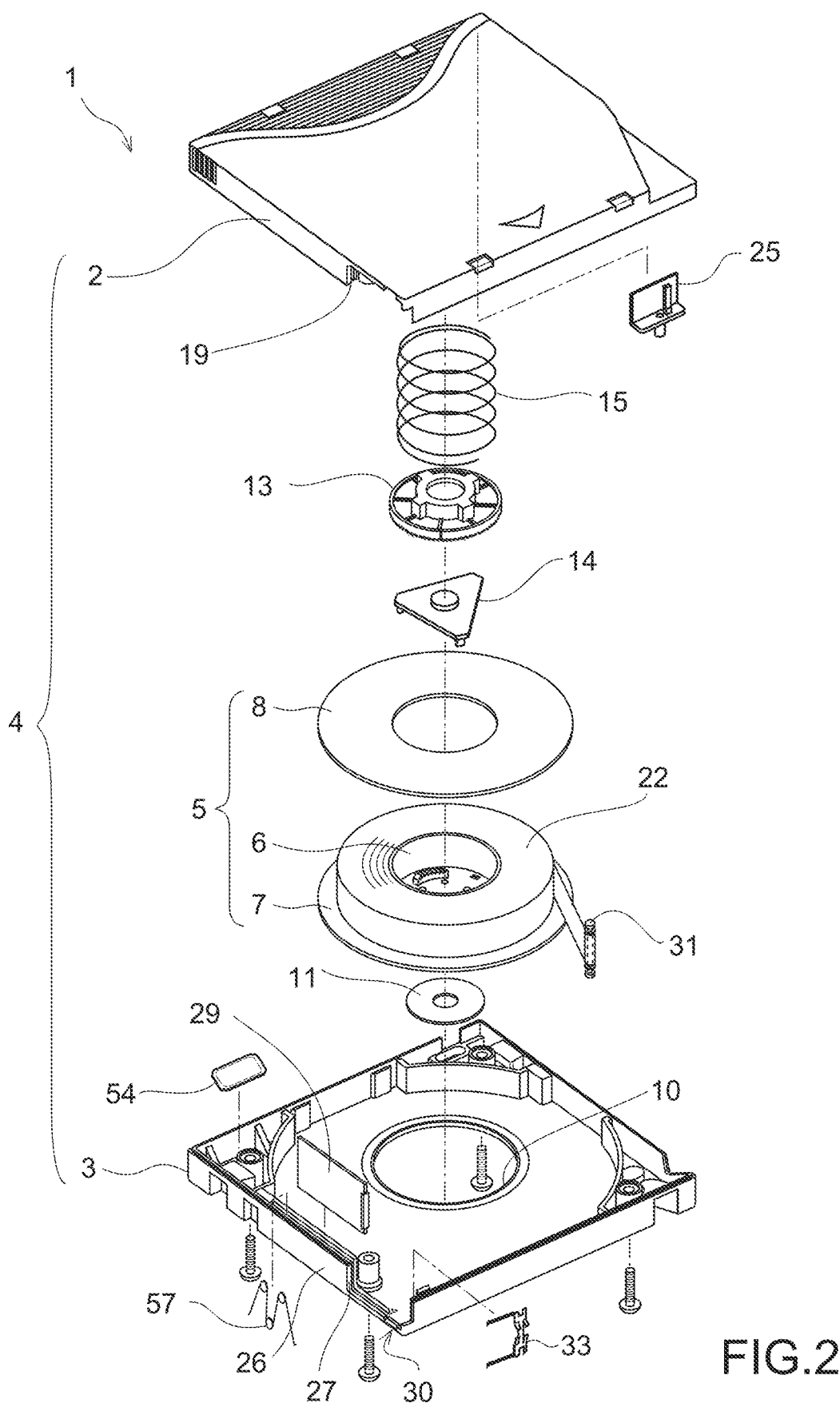
FIG. 2 is an exploded perspective view of the tape cartridge.
Figure 3:
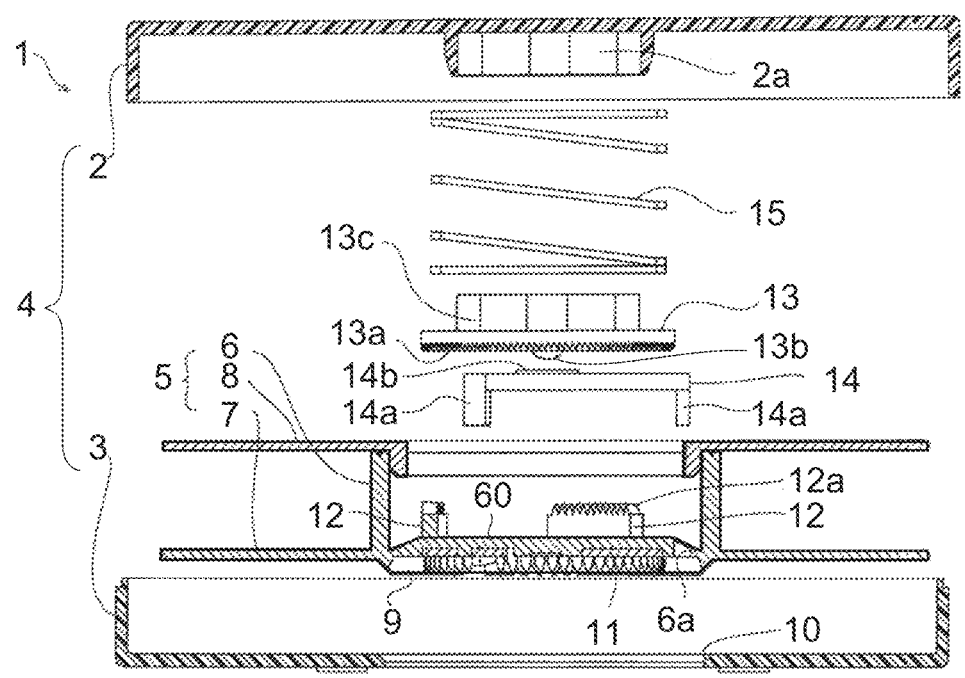
FIG. 3 is an exploded cross-sectional side view of the tape cartridge.

FIG. 1 is an overall perspective view of a tape cartridge 1 according to an embodiment of the present technology, Part A being a perspective view when viewed from the upper surface (upper shell 2) side, Part B being a perspective view when viewed from the lower surface (lower shell 3) side. FIG. 2 is an exploded perspective view of the tape cartridge 1, and FIG. 3 is an exploded cross-sectional side view thereof.

[Configuration of Entire Tape Cartridge]

The tape cartridge 1 according to this embodiment has a configuration in which a single tape reel 5 on which a magnetic tape 22 is wound is rotatably housed inside a cartridge case 4 formed by connecting an upper shell 2, having an upper shell part 19, and a lower shell 3, having a lower shell part 30, to each other with a plurality of screw members. The tape cartridge 1 according to this embodiment will be described below taking a magnetic tape cartridge conforming to the LTO (Linear Tape Open) standard as an example.

The tape reel 5 includes a bottomed cylindrical reel hub 6, a lower flange 7 formed integrally with the lower end portion of the reel hub 6, and an upper flange 8 bonded to the upper end portion of the reel hub 6, each of which are formed by an injection molded body of a synthetic resin material.

A chucking gear 9 that engages with a reel rotation drive shaft of a tape drive device is annularly formed in the center of the lower surface of the tape reel 5, and is exposed to the outside via an opening 10 provided in the center of the lower shell 3 as shown in Part B of FIG. 1. On the inner peripheral side of this chucking gear 9, an annular metal plate 11 magnetically attracted to the reel rotation drive shaft described above is fixed to the bottom outer surface of the reel hub 6 by insert-molding.

A reel locking mechanism for preventing the tape reel 5 from rotating when the tape cartridge 1 is not in use is provided inside the reel hub 6. As shown in FIG. 3, the reel locking mechanism includes a plurality of gear forming walls 12 erected on the upper surface of a bottom portion 60 of the reel hub 6, a reel lock member 13 including engagement teeth 13a that engage with a gear portion 12a formed on the upper surface of the gear forming wall 12, a reel lock release member 14 for releasing the engagement between the gear forming wall 12 and the reel lock member 13, and a reel spring 15 provided between the inner surface of the upper shell 2 and the upper surface of the reel lock member 13. The reel spring 15 is a coil spring, and biases the tape reel 5 toward the lower shell 3 via the reel lock member 13.

The gear forming wall 12 has a circular arc shape, and three gear forming walls 12 are formed on the upper surface of the bottom portion 60 of the reel hub 6 at equal intervals on the same circumference around the axial center of the reel hub 6. The engagement teeth 13a of the reel lock member 13 facing the gear portion 12a of the gear forming wall 12 are annularly formed on the lower surface of the reel lock member 13, and constantly biased in the direction of engaging with the gear portion 12a under the reel spring 15. A fitting projecting portion 13c is formed on the upper surface of the reel lock member 13, and a fitting recessed portion 2a that fits into this fitting projecting portion 13c is formed in the substantially central portion of the inner surface of the upper shell 2.

The reel lock release member 14 has a substantially triangular shape and is disposed between the bottom portion 60 of the reel hub 6 and the reel lock member 13. On the lower surface of the reel lock release member 14, a total of three legs 14a are formed to protrude downward from the vicinity of the apexes of the substantially triangular shape. These legs are positioned between the gears of the chucking gear 9 via an insertion hole 6a formed in the bottom portion 60 of the reel hub 6 when the cartridge is not in use.

Each of the legs 14a of the reel lock release member 14 is pressed upward by the reel rotation drive shaft of the tape drive device, which engages with the chucking gear 9, when the cartridge is in use, and causes the reel lock member 13 to move to the unlocked position against the biasing force of the reel spring 15. Further, the legs 14a are configured to be rotatable with respect to the reel lock member 13 together with the tape reel 5. A support surface 14b for supporting a sliding contact portion 13b having a circular arc shape in cross section, which is formed to protrude in the substantially central portion of the lower surface of the reel lock member 13, is provided in the substantially central portion of the upper surface of the reel lock release member 14.

An outlet 27 for pulling out one end of the magnetic tape 22 to the outside is provided to a side wall 26 of the cartridge case 4. A slide door 29 that opens and closes the outlet 27 is disposed on the inner side of the side wall 26. The slide door 29 is configured to slide in the direction of opening the outlet 27 against the biasing force of a torsion spring 57 by engaging with a tape loading mechanism (illustration omitted) of the tape drive device.

A leader pin 31 is fixed to one end portion of the magnetic tape 22. The leader pin 31 is configured to be attachable/detachable to/from a pin holding portion 33 provided on the inner side of the outlet 27. The pin holding portion 33 is attached to the inner surface of the upper shell 2 and the inner surface of the lower shell 3, and is configured to be capable of elastically holding the upper end portion and the lower end portion of the leader pin 31.

In addition to a safety tab 25 for preventing erroneous erasure of information recorded on the magnetic tape 22, a cartridge memory 54 capable of reading and writing the content relating to information recorded on the magnetic tape 22 in a non-contact manner is disposed inside the cartridge case 4. The cartridge memory 54 includes a non-contact communication medium in which an antenna coil, an IC chip, and the like are mounted on a substrate.

[Tape Reel]

Subsequently, details of the tape reel 5 will be described.

The tape reel 5 includes the reel hub 6, the lower flange 7 as a first flange, and the upper flange 8 as a second flange, as described above. In this embodiment, the lower flange 7 is formed integrally with the lower end portion (first end portion) of the reel hub 6, and the upper flange 8 is bonded to the upper end portion (second end portion) of the reel hub 6 by ultrasonic bonding or the like. The reel hub 6 has a substantially cylindrical shape, and the height thereof in the axial direction is slightly larger than the width (12.65 mm) of the magnetic tape 22 and is approximately 13 mm (12.87 mm). The inner diameter of the reel hub 6 is approximately 40 mm (39.6 mm), and the thickness that is the thickness dimension in the radial direction is approximately 2 mm.

The reel hub 6 and the lower flange 7 are integrally molded using a synthetic resin material such as PC (polycarbonate) and ABS (acrylonitrile-butadiene-styrene). Similarly, the upper flange 8 is also molded using a synthetic resin material such as PC and ABS. As the molding material of the reel hub 6 and the lower flange 7, a composite material obtained by adding an inorganic filler such as a glass filler to the synthetic resin material may be used for the purpose of improving the strength. The weight ratio of the glass filler is not particularly limited and is, for example, approximately 10% or more and 30% or less with respect to the synthetic resin material that is the base. In this embodiment, a composite material containing a glass filler having the weight ratio of 10% or more and 20% or less in a polycarbonate resin is used as the molding material of the reel hub 6.

(Basic Configuration of Reel Hub)

Figure 4:
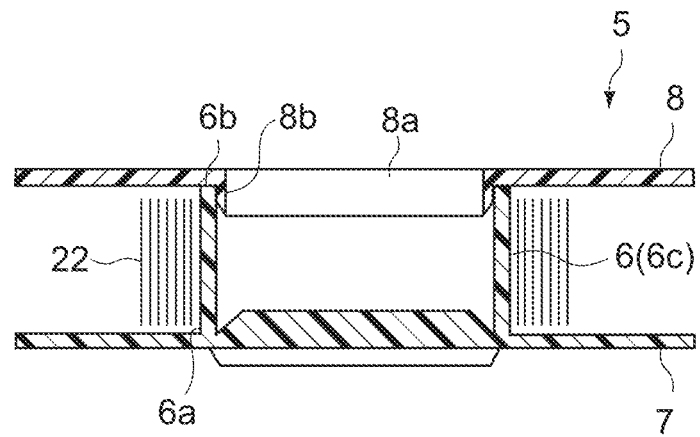
FIG. 4 is a schematic cross-sectional side view of a tape reel according to the embodiment of the present technology.

FIG. 4 is a schematic cross-sectional side view of the tape reel 5. The reel hub 6 has a cylindrical shape having a uniform thickness from a lower end portion 6a formed integrally with the lower flange 7 across an upper end portion 6b bonded to the upper flange 8. The upper flange 8 is positioned by fitting an annular projecting portion 8b formed along the peripheral edge of an opening 8a provided in the center into the inner peripheral surface of the upper end portion 6b of the reel hub 6. The reel hub 6 is ultrasonically bonded to the upper flange 8 immediately above the upper end portion 6b.

Figure 5:
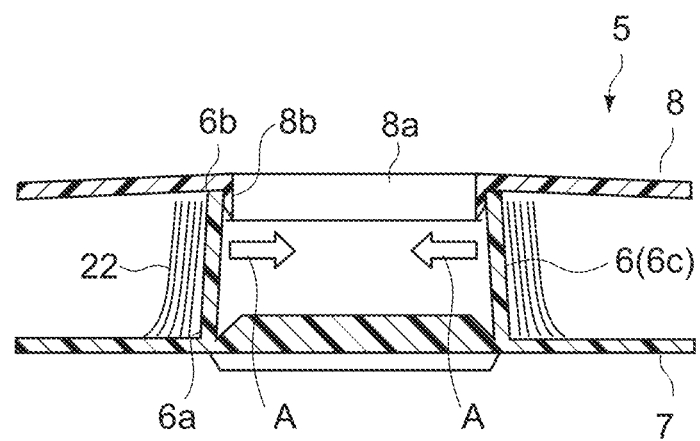
FIG. 5 is a schematic cross-sectional view describing a typical action of the tape reel.
Figure 6:
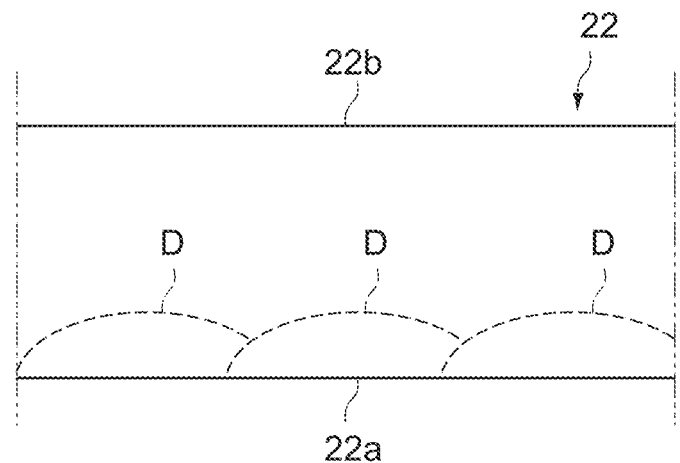
FIG. 6 is a schematic diagram of a main part of the magnetic tape for describing problems associated with deformation of the tape reel shown in FIG. 5.

An outer peripheral surface 6c of the reel hub 6 functions as a winding surface on which the magnetic tape 22 is wound. The outer peripheral surface 6c is typically a flat cylindrical surface. The outer peripheral surface 6c of the reel hub 6 is pressed radially inward by tightening (winding pressure) of the magnetic tape 22. In the reel structure in which the reel hub 6 is molded integrally with the lower flange 7, since the rigidity on the side of the upper end portion 6b is lower than that on the side of the lower end portion 6a of the reel hub 6, the winding pressure of the magnetic tape 22 acts as a pressing force that pushes the upper end portion 6b of the reel hub 6 radially inward with respect to the upper flange 8 (see arrows A) as shown in a slightly exaggerated manner in FIG. 5. When the upper end portion 6b of the reel hub 6 is deformed radially inward by receiving this pressing force, the difference in outer diameter between both end portions of the reel hub 6 increases, and a lower edge portion 22a of the magnetic tape 22 facing the lower flange 7 is deformed to be longer than an upper edge 22b of the magnetic tape facing the upper flange 8 in some cases as schematically shown in FIG. 6. In this case, there is a possibility that deformation wrinkles D are generated in the lower edge 22a, which causes insufficient contact between a region of the magnetic tape 22 on the lower edge side and a drive head, making it impossible to stably read and write data.

In particular, in recent years, as the recording capacity of the tape cartridge has increased, the thickness of the magnetic tape has been reduced, the tape length has increased, and thus, the winding pressure to be applied to the reel hub tends to increase. Further, the winding pressure to be applied to the reel hub further increases due to the influence of long-term preservation of the tape cartridge under high-temperature and high-humidity environments, and thus, the amount of deformation of the upper end portion 6b of the reel hub 6 tends to increase more and more.

The present inventors have found that deformation of the upper end portion 6b of the reel hub 6 due to the winding pressure of the magnetic tape 22 can be suppressed by forming the outer peripheral surface of the reel hub 6 into the shape described below instead of a flat cylindrical surface. The details thereof will be described below.

(Shape of Outer Peripheral Surface of Reel Hub)

Figure 7:
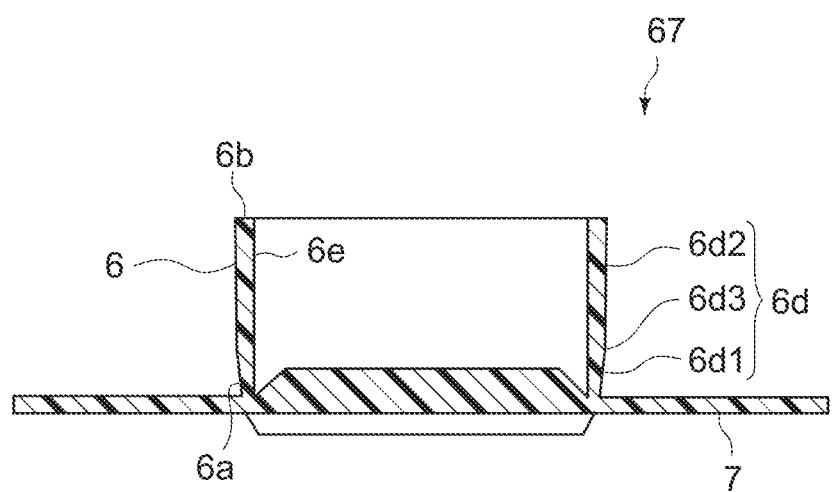
FIG. 7 is a cross-sectional side view of a reel half forming the tape reel according to the embodiment of the present technology.
Figure 8:
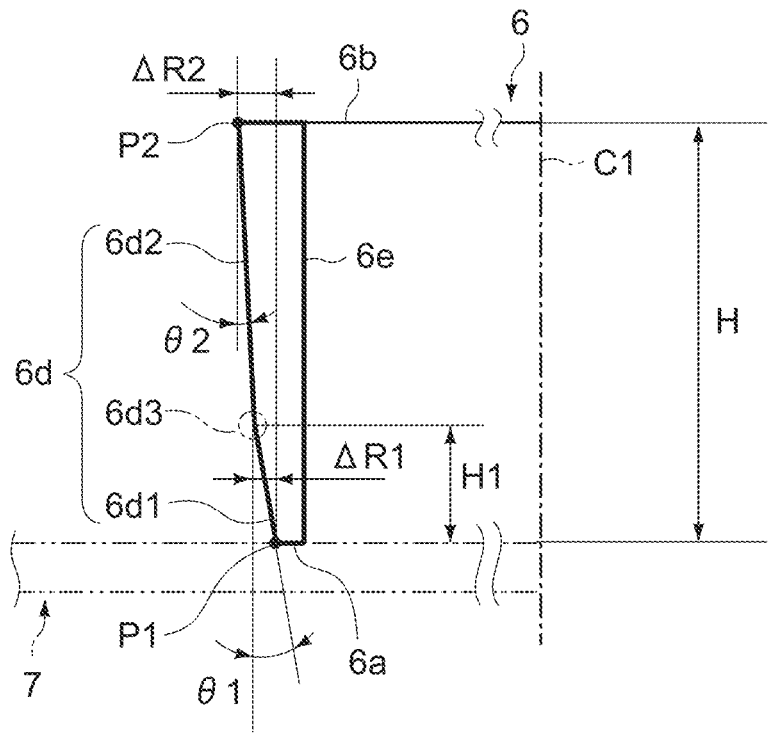
FIG. 8 is an enlarged cross-sectional view of a main part of a reel hub in the tape reel.

FIG. 7 is a cross-sectional side view of a reel half 67 in which the reel hub 6 and the lower flange 7 are integrally formed according to this embodiment, and FIG. 8 is an enlarged cross-sectional view of a main part of the reel hub 6.

As shown in FIG. 7, the reel hub 6 includes the lower end portion 6a (first end portion) formed integrally with the lower flange 7 (first flange), the upper end portion 6b (second end portion) to which the upper flange 8 is bonded, an outer peripheral surface 6d on which the magnetic tape 22 is wound, and an inner peripheral surface 6e.

As shown in the enlarged illustration in FIG. 8, the outer peripheral surface 6d of the reel hub 6 has a first outer peripheral region 6d1 and a second outer peripheral region 6d2. Meanwhile, the inner peripheral surface 6e of the reel hub 6 typically has a flat cylindrical surface shape.

The first outer peripheral region 6d1 is a region that expands in diameter from the lower end portion 6a of the reel hub 6 toward the upper end portion 6b. The shape of the first outer peripheral region 6d1 is not particularly limited as long as it expands in diameter from the lower end portion 6a of the reel hub 6 toward the upper end portion 6b. For example, the first outer peripheral region 6d1 may have a linear tapered surface or may be formed in a curved surface. The shape of the curved surface may be a bulging surface having a shape projecting radially outward of the reel hub 6, a recessed surface having a shape projecting radially inward of the reel hub 6, or a composite curved surface including the bulging surface and the recessed surface. That is, the surface shape of the first outer peripheral region 6d1 can be arbitrarily adjusted in accordance with the molding conditions (a molding material, molding temperature, surface properties of the mold for molding, and the like) of the reel hub 6.

The second outer peripheral region 6d2 is a region that expands in diameter from the first outer peripheral region 6d1 across the upper end portion 6b of the reel hub 6 and forms a ridge line portion 6d3 on the boundary between the second outer peripheral region 6d2 and the first outer peripheral region 6d1.

The shape of the second outer peripheral region 6d2 is not particularly limited as long as it expands in diameter from the ridge line portion 6d3 toward the upper end portion 6b of the reel hub 6. For example, the second outer peripheral region 6d2 may have a linear tapered surface or may be formed in a curved surface. The shape of the curved surface may be a bulging surface having a shape projecting radially outward of the reel hub 6, a recessed surface having a shape projecting radially inward of the reel hub 6, or a composite curved surface including the bulging surface and the recessed surface. Similarly to the first outer peripheral region 6d1, the surface shape of the second outer peripheral region 6d2 can be arbitrarily adjusted in accordance with the molding conditions (a molding material, molding temperature, surface properties of the mold for molding, and the like) of the reel hub 6.

The ridge line portion 6d3 has a shape projecting radially outward of the reel hub 6. That is, as shown in FIG. 8, when the taper angle of the first outer peripheral region 6d1 (angle formed by the line segment connecting an outer peripheral edge portion P1 of the lower end portion 6a of the reel hub 6 and the ridge line portion 6d3 with respect to an axial center C1) is defined as θ1 and the taper angle of the second outer peripheral region 6d2 (angle formed by the line segment connecting an outer peripheral edge portion P2 of the upper end portion 6b of the reel hub 6 and the ridge line portion 6d3 with respect to the axial center C1) is defined as θ2, the relationship of $\theta_1 > \theta_2$ is satisfied.

The ridge line portion 6d3 corresponds to an inclination inflection point that connects the first outer peripheral region 6d1 having the taper angle θ1 and the second outer peripheral region 6d2 having the taper angle θ2. The cross-sectional shape of the ridge line portion 6d3 along the direction of the axial center C1 is not particularly limited, and may be a corner portion formed between the first outer peripheral region 6d1 and the second outer peripheral region 6d2 or a curved surface formed between them.

Figure 9:
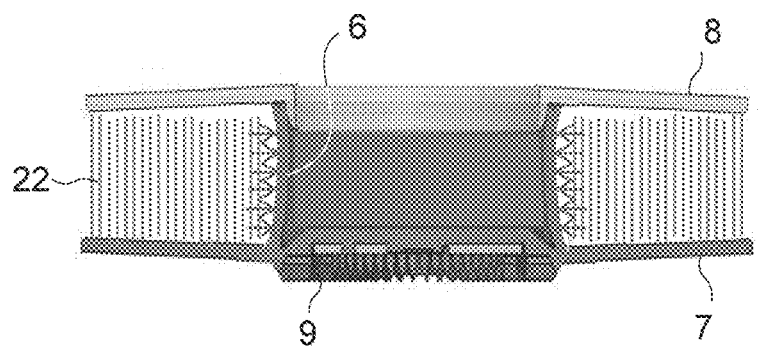
FIG. 9 is a schematic cross-sectional view describing an action of the tape reel.

By providing the first outer peripheral region 6d1 on the outer peripheral surface 6d of the reel hub 6, the radius of the lower end portion 6a of the reel hub 6 is smaller than the radius of the upper end portion 6b. That is, the thickness of the lower end portion 6a can be made smaller than the thickness of the upper end portion 6b. For this reason, when the winding pressure of the magnetic tape 22 acts on the reel hub 6 or at the time of preservation for a long period of time under high-temperature and high-humidity environments, the bending stress around the connection region between the lower end portion 6a of the reel hub 6 and the lower flange 7 makes it easier for the reel hub 6 to deform radially inward across the entire region in the height direction. For this reason, the upper end portion 6b of the reel hub 6 is prevented from falling radially inward as shown in FIG. 5, the central portion of the reel hub 6 in the height direction can be deformed so as to have a curved shape projecting radially inward as shown in FIG. 9. As a result, the difference in outer diameter between both end portions of the reel hub 6 can be reduced, and thus, it is possible to prevent deformation wrinkles as shown in FIG. 6 from being generated in the lower edge portion 22a of the magnetic tape 22 and provide stable recording and reproduction properties of the magnetic tape 22.

Further, by providing the second outer peripheral region 6d2 on the outer peripheral surface 6d of the reel hub 6, it is possible to keep the difference in outer diameter between the lower end portion 6a and the upper end portion 6b of the reel hub 6 within a certain range. As a result, it is possible to prevent the winding of the magnetic tape 22 from distorting at the start of winding the magnetic tape 22 onto the reel hub 6 and reduce damage to the edge portion of the magnetic tape 22 due to interference with the lower flange 7 or the upper flange 8.

Further, by providing the second outer peripheral region 6d2 on the outer peripheral surface 6d of the reel hub 6, when the reel hub 6 is deformed by the winding pressure of the magnetic tape 22, the second outer peripheral region 6d2 of the reel hub 6 can be made more parallel to the axial center C1. As a result, the winding of the magnetic tape 22 becomes more stable, and it is possible to further reduce the damage to the edge portion of the magnetic tape 22.

Here, the ridge line portion 6d3 is favorably located closer to the lower end portion 6a of the reel hub 6 than the center of a height H (12.87 mm) of the reel hub 6. In this embodiment, a height H1 of the reel hub 6 from the lower end portion 6a is 3 mm or more and 5 mm or less. In the case where the height H1 is less than 3 mm, the above-mentioned effects of this embodiment cannot be effectively produced in some cases. Further, when the height H1 exceeds 5 mm, there is a possibility that the releasability of the mold for molding for forming the outer peripheral surface 6d of the reel hub 6 is reduced as described below. By setting the height H1 to 3 mm or more and 5 mm or less, it is possible to prevent the upper end portion 6b of the reel hub 6 from deforming so as to fall radially inward (see FIG. 5) during long-term preservation of the tape cartridge 1 under high-temperature and high-humidity environments while achieving favorable moldability of the reel hub 6.

Further, in this embodiment, as shown in FIG. 8, a difference ΔR1 between the radius of the ridge line portion 6d3 and the radius of the outer peripheral edge portion P1 with the axial center C1 as the center is 5 μm or more and 25 μm or less. That is, the difference between the outer diameter of the ridge line portion 16d3 and the outer diameter of the lower end portion 6a of the reel hub 6 is 10 μm or more and 50 μm or less. As a result, the ridge line portion 6d3 can be stably formed at the position of the height H1.

Further, a difference ΔR2 between the radius of the lower end portion 6a of the reel hub 6 and the radius of the upper end portion 6b of the reel hub 6 with the axial center C1 as the center is 15 μm or more and 45 μm or less. That is, the difference between the outer diameter of the lower end portion 6a of the reel hub 6 and the outer diameter of the upper end portion 6a of the reel hub 6 is 30 μm or more and 90 μm or less. As a result, it is possible to effectively prevent the upper end portion 6b of the reel hub 6 from falling radially inward during long-term preservation of the tape cartridge 1 under high-temperature and high-humidity environments.

Note that the magnitudes of the height H1 and the radius differences ΔR1 and ΔR2 are not limited to the examples described above, and can be arbitrarily set in accordance with the height, thickness, and type of molding material, and the like of the reel hub 6. For example, in the case where a synthetic resin material containing a glass filler is used as the molding material, the rigidity of the reel hub 6 changes depending on the type of synthetic resin material, the content of the glass filler, and the like. For this reason, it is favorable to optimize each of the dimensions described above in accordance with the rigidity of the reel hub 6.

[Apparatus for Producing Reel Hub]

Figure 10:
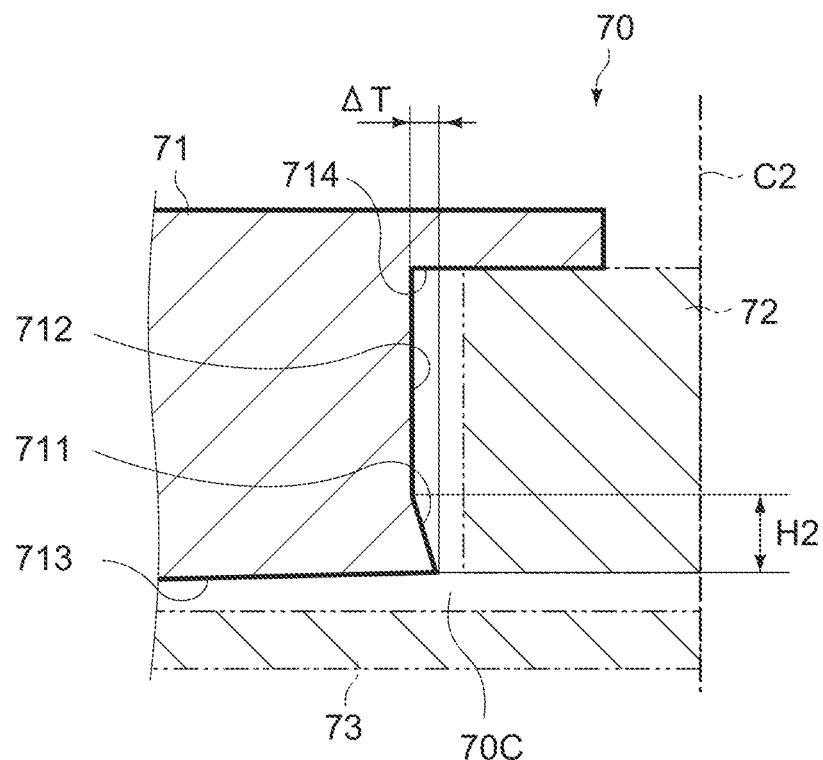
FIG. 10 is a cross-sectional side view of a mold apparatus that is an apparatus for producing the reel half shown in FIG. 7.

FIG. 10 is a cross-sectional side view of a mold apparatus 70 that is an apparatus for producing the reel half 67 shown in FIG. 7. The mold apparatus 70 includes a first mold 71 for molding the outer peripheral surface 6d of the reel hub 6 and the inner surface of the lower flange 7, a second mold 72 for molding the inner peripheral surface 6e of the reel hub 6 and the inner bottom surface of the reel hub 6, and a third mold 73 for molding the outer surface of the lower flange 7.

The first mold 71 forms a cavity 70C to be filled with a molding material between the first mold 71 and the second mold 72 and the third mold 73. The first mold 71 has a first molding surface 711 for forming the first outer peripheral region 6d1 of the reel hub 6, a second molding surface 712 for forming the second outer peripheral region 6d2 of the reel hub 6, a third molding surface 713 for forming the inner surface of the lower flange 7, and a fourth molding surface 714 for forming the upper end portion 6b of the reel hub 6.

The first molding surface 711 is a tapered surface having an inverted truncated cone shape that is inclined at an angle θ1 with respect to an axial center C2. The second molding surface 712 is a cylindrical surface parallel to the axial center C2. In this embodiment, a height H2 of the first molding surface 711 is 3 μm or more and 5 μm or less. A difference ΔT between the minimum radius of the first molding surface 711 (radius of the lower end portion of the first molding surface 711) and the maximum radius of the first molding surface 711 (radius of the second molding surface 712) with the axial center C2 as the center is 7 μm or more and 15 μm or less.

As a result, it is possible to stably form the first outer peripheral region 6d1 having the shape shown in FIG. 8. Note that the H2 exceeds 5 μm and ΔT exceeds 15 μm, there is a possibility that the releasability of the first mold 71 using the heat shrinkage of the first outer peripheral region 6d1 after molding is impaired. Therefore, it is favorable to appropriately adjust the upper limits of these values in accordance with the type of molding material to be used.

The reel half 67 is molded by injecting a molding material (composite material of polycarbonate and a glass filler) into the cavity 70C from a gate (not shown). As a result, it is possible to form the reel hub 6 having the outer peripheral surface 6d that includes the first outer peripheral region 6d1 and the second outer peripheral region 6d2 as shown in FIG. 7. Further, the second outer peripheral region 6d2 formed by the second molding surface 712 has an inclined surface with the taper angle θ2 shown in FIG. 8 by the heat shrinkage of the molding material after molding.

Figure 11:
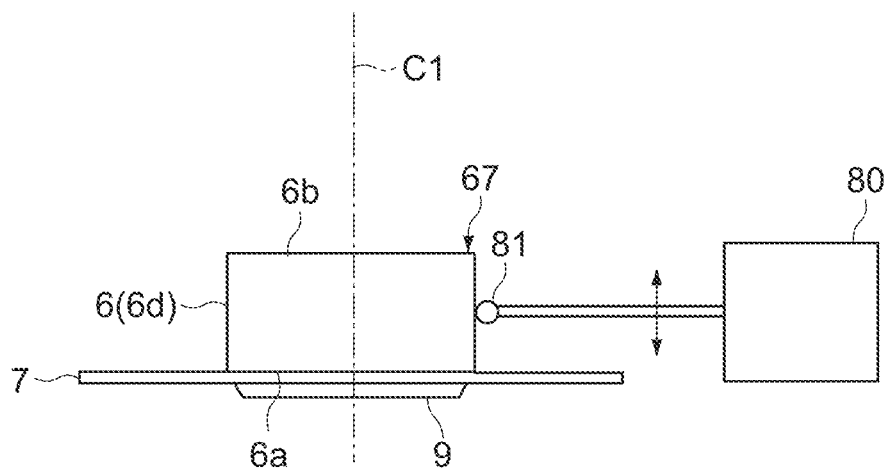
FIG. 11 is a diagram describing a method of measuring the gradient of the outer peripheral surface of the reel hub.

As shown in FIG. 11, the present inventors measured the gradient of the outer peripheral surface 6d of the reel hub 6 after molding. As a measuring device, "Mitutoyo Roundtest RA-2100" manufactured by Mitutoyo Corporation was used. The measurement procedure is as follows.

First, the chucking gear 9 (see Part B of FIG. 1) at the bottom of the reel hub 6 is set on a jig (master gear) on a rotary table (not shown) to rotatably support the reel half 67. While the reel half 67 is stopped, a probe 81 (having a diameter of 1.6 mm) is brought into contact with the outer peripheral surface 6d of the reel hub 6 and the probe 81 is caused to trace up and down, by a probe member 80, to measure the gradient of the outer peripheral surface 6d. Note that for the purpose of avoiding breakage of the probe 81, the origin of measurement was set at the position 1 mm above the lower end portion 6a of the reel hub 6 and the measurement length was set to 11 mm.

After the trace of the probe 81, the rotary table was caused to rotate by 30° and then, measurement similar to that described above was performed. By repeating this operation 12 times, the reel hub 6 was measured at 12 points in the entire circumferential direction. The average value of the measured waveforms obtained at 12 points is shown as a gradient waveform TR1 in FIG. 12 (left side in the figure).

Subsequently, the upper flange 8 was bonded to the reel half 67 to prepare the tape reel 5, and then, the magnetic tape 22 having a length of 1000 m was wound around this tape reel 5 with a tension of 0.55 N to prepare the tape cartridge 1. This tape cartridge 1 was preserved for one week in a constant temperature bath maintained at a temperature of 49° C. and a relative humidity of 80%, which are acceleration test conditions. After that, it was left to stand for 24 hours in a room temperature environment with a temperature of 23° C.±2° C. and a relative humidity of 40 to 60%. Then, the tape reel 5 was drawn out of this tape cartridge 1 and the gradient of the outer peripheral surface of the reel hub 6 after taking out the magnetic tape 22 was measured by a method similar to that described above. The result is shown as the gradient waveform TR2 in FIG. 12 (right side in the figure).

Figure 12:
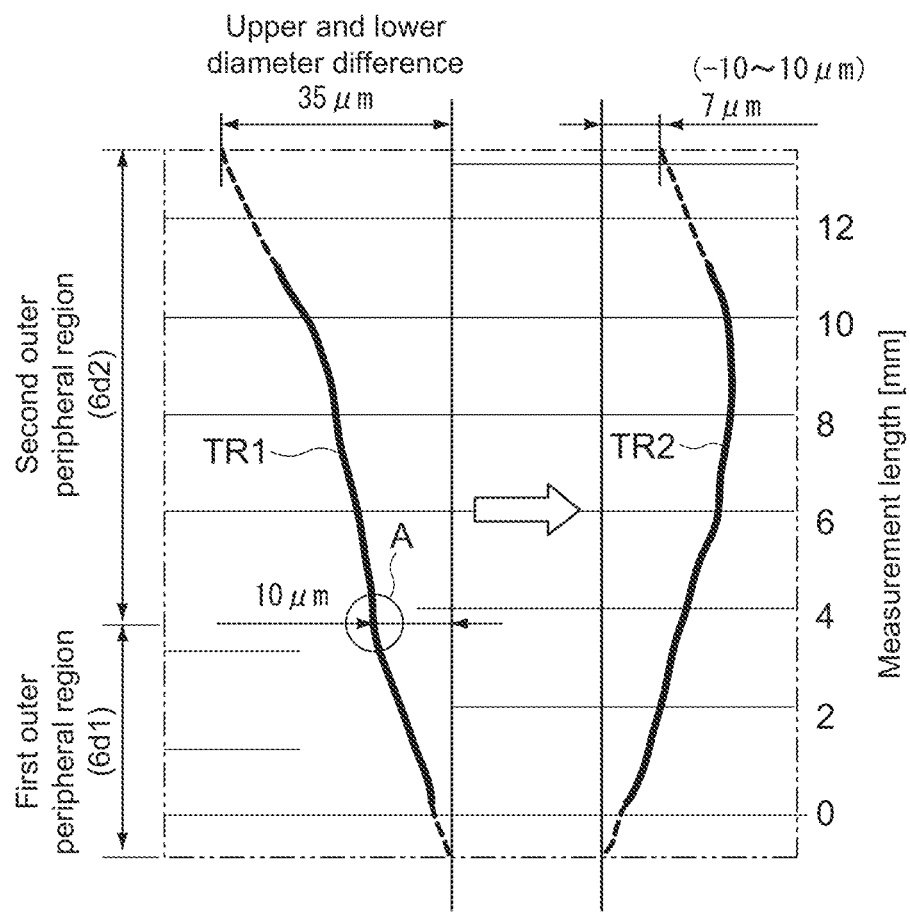
FIG. 12 is a diagram showing the measurement results of the gradient of the outer peripheral surface of the reel hub molded using the mold apparatus shown in FIG. 10.

In the gradient waveform TR1 of the outer peripheral surface 6d of the reel hub 6 immediately after molding, an inflection point of an inclination angle corresponding to the ridge line portion 6d3 (see FIG. 8) was observed at the boundary between the first region 6d1 and the second gradient region 6d2 (see the region indicated by a circle A in FIG. 12). Further, the difference in radius between the both end portions (6a and 6b) of the reel hub 6 was approximately 35 μm.

Meanwhile, in accordance with the gradient waveform TR2 of the outer peripheral surface 6d of the reel hub 6 after the acceleration test, the state in which the upper end portion 6b of the reel hub 6 was prevented from falling radially inward and the intermediate region between the lower end portion 6a and the upper end portion 6b deformed so as to bend radially inward was observed. Further, the difference in radius of the upper end portion 6b from the radius of the lower end portion 6a of the reel hub 6 was approximately 7 μm.

Note that the experiment performed by the present inventors confirmed that the radius difference of the reel hub 6 after the acceleration test was favorably 10 μm or less in order to prevent deformation wrinkles in the edge portion of the magnetic tape 22 due to deformation of the reel hub 6.

Figure 13:
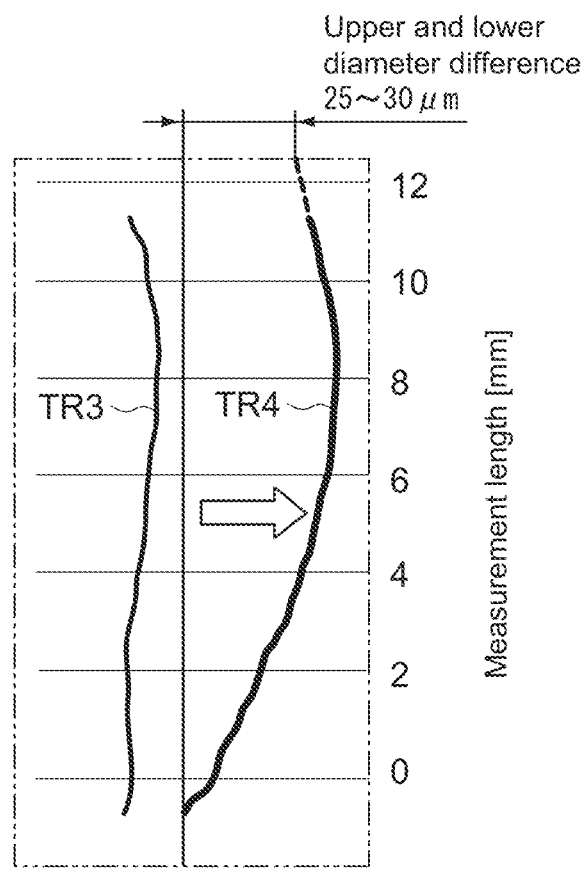
FIG. 13 is a diagram showing the measurement results of the gradient of the outer peripheral surface of the reel hub of the tape reel shown in FIG. 5.

As a Comparative Example, regarding a reel hub having the outer peripheral surface 6c (see FIG. 4) that is a flat cylindrical surface, which does not include the first outer peripheral region 6d1 and the second outer peripheral region 6d2, the result of measuring the gradient waveform of the outer peripheral surface of the hub by a method similar to that described above is shown in FIG. 13. In FIG. 13, the left side is a gradient waveform TR3 of the outer peripheral surface 6c immediately after molding, and the right side is a gradient waveform TR4 of the outer peripheral surface 6c after the acceleration test described above. As shown in the figure, the radius difference between both end portions of the reel hub after the acceleration test was 25 µm to 30 µm.

[Details of Magnetic Tape]

Subsequently, details of the magnetic tape 22 used in this embodiment will be described.

Figure 14:
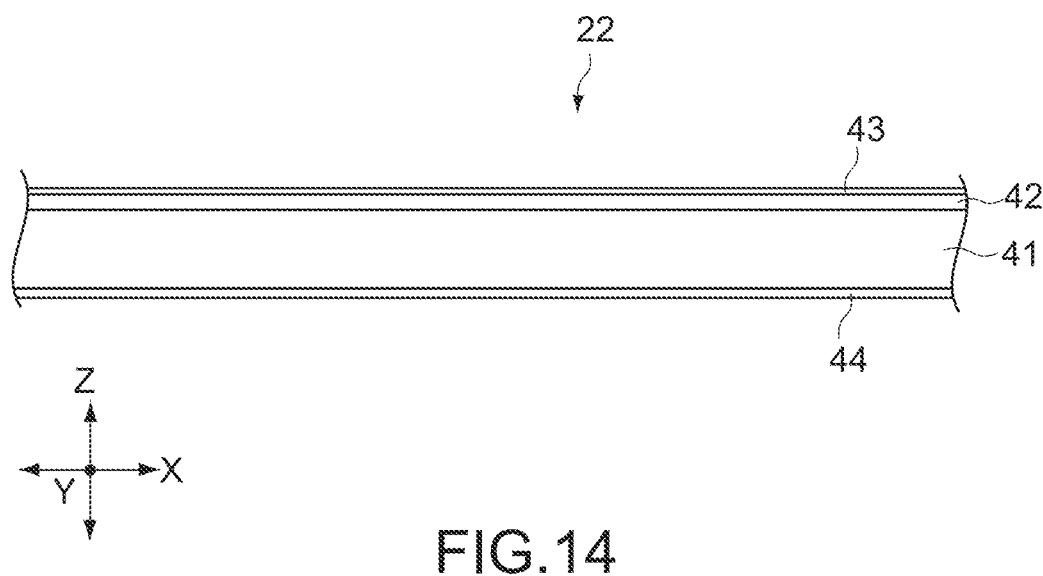
FIG. 14 is a schematic diagram of the magnetic tape when viewed from the side.

FIG. 14 is a schematic diagram of the magnetic tape 22 when viewed from the side. As shown in FIG. 14, the magnetic tape 22 is formed in a tape shape that is long in the longitudinal direction (X-axis direction), short in the width direction (Y-axis direction), and thin in the thickness direction (Z-axis direction).

The magnetic tape 22 includes a tape-shaped base material 41 that is long in the longitudinal direction (X-axis direction), an underlayer (non-magnetic layer) 42 provided on one main surface of the base material 41, a magnetic layer 43 provided on the underlayer 42, and a back layer 44 provided on the other main surface of the base material 41. Note that the back layer 44 only needs to be provided as required and this back layer 44 may be omitted. The magnetic tape 22 may be a perpendicular recording magnetic recording medium or may be a longitudinal recording magnetic recording medium.

The magnetic tape 22 has a long tape shape and is caused to travel in the longitudinal direction during recording and reproduction. Note that the surface of the magnetic layer 43 is a surface on which a magnetic head included in a recording/reproduction apparatus (not shown) is caused to travel. The magnetic tape 22 is favorably used in a recording/reproduction apparatus including a ring-type head as a recording head. The magnetic tape 22 is favorably used in a recording/reproduction apparatus configured to be capable of recording data with a data track width of 1500 nm or less or 1000 nm or less.

(Base Material)

The base material 41 is a non-magnetic support that supports the underlayer 42 and the magnetic layer 43. The base material 41 has a long film shape. The upper limit value of the average thickness of the base material 41 is favorably 4.2 µm or less, more favorably 3.8 µm or less, and still more favorably 3.4 µm or less. When the upper limit value of the average thickness of the base material 41 is 4.2 µm or less, it is possible to make the recording capacity of a single data cartridge larger than that of a general magnetic tape. The lower limit value of the average thickness of the base material 41 is favorably 3 µm or more, and more favorably 3.2 µm or more. When the lower limit value of the average thickness of the base material 41 is 3 µm or more, it is possible to suppress a decrease in the strength of the base material 41.

The average thickness of the base material 41 is obtained as follows. First, the magnetic tape 22 having a width of ½ inch is prepared and cut into a length of 250 mm to prepare a sample. Subsequently, the layers of the sample other than the base material 41 (i.e., the underlayer 42, the magnetic layer 43, and the back layer 44) are removed with a solvent such as MEK (methyl ethyl ketone) and dilute hydrochloric acid. Next, a Laser Hologage (LGH-110C) manufactured by Mitutoyo Corporation is used as a measuring apparatus to measure the thickness of the sample (base material 41) at five or more positions, and the measured values are simply averaged (arithmetically averaged) to calculate the average thickness of the base material 41. Note that the measurement positions are randomly selected from the sample.

The base material 41 contains polyester. When the base material 41 contains polyester, it is possible to reduce the Young's modulus of the base material 41 in the longitudinal direction. Therefore, it is possible to keep the width of the magnetic tape 22 constant or substantially constant by adjusting the tension of the magnetic tape 22 in the longitudinal direction during travelling by the recording/reproduction apparatus.

The polyester includes, for example, at least one of polyethylene terephthalate (PET), polyethylene naphthalate (PEN), polybutylene terephthalate (PBT), polybutylene naphthalate (PBN), polycyclohexylene dimethylene terephthalate (PCT), polyethylene-p-oxybenzoate (PEB), or polyethylene bisphenoxycarboxylate. In the case where the base material 41 contains two or more types of polyesters, the two or more types of polyesters may be mixed, may be copolymerized, or may be stacked. At least one of the terminal or the side chain of the polyester may be modified.

The fact that the base material 41 contains polyester can be confirmed, for example, as follows. First, the layers of the sample other than the base material 41 are removed in a way similar to that in the measurement method of the average thickness of the base material 41. Next, the IR spectrum of the sample (base material 41) is acquired using the infrared absorption spectrometry (IR). On the basis of this IR spectrum, the fact that the base material 41 contains polyester can be confirmed.

The base material 41 may further contain, for example, at least one of polyamide, polyetheretherketone, polyimide, or polyamideimide in addition to the polyester, or may further contain at least one of polyamide, polyimide, polyamideimide, polyolefins, a cellulose derivative, a vinyl resin, or another polymer resin. The polyamide may be aromatic polyamide (aramid). The polyimide may be aromatic polyimide. The polyamideimide may be aromatic polyamideimide.

In the case where the base material 41 contains a polymer resin other than polyester, the base material 41 favorably contains polyester as a main component. Here, the main component means the component with the highest content (mass ratio), of the polymer resins contained in the base material 41. In the case where the base material 41 contains a polymer resin other than polyester, the polyester and the polymer resin other than the polyester may be mixed or may be copolymerized.

The base material 41 may be biaxially stretched in the longitudinal direction and the width direction. The polymer resin contained in the base material 41 is favorably oriented in an oblique direction with respect to the width direction of the base material 41.

(Magnetic Layer)

The magnetic layer 43 is a recording layer for recording a signal with a magnetization pattern. The magnetic layer 43 may be a recording layer of a perpendicular recording type or may be a recording layer of a longitudinal recording type. The magnetic layer 43 contains, for example, magnetic powder, a binder, and a lubricant. The magnetic layer 43 may further contain at least one additive of an antistatic agent, an abrasive, a curing agent, a rust inhibitor, a non-magnetic reinforcing particle, or the like, as necessary. The magnetic layer 43 does not necessarily need to include a coating film of a magnetic material and may include a sputtering film or a deposition film of a magnetic film.

An arithmetic average roughness Ra of the surface of the magnetic layer 43 is 2.0 nm or less, favorably 1.8 nm or less, and more favorably 1.6 nm or less. When the arithmetic average roughness Ra is 2.0 nm or less, since the output reduction due to spacing loss can be suppressed, excellent electromagnetic conversion characteristics can be achieved.

The lower limit value of the arithmetic average roughness Ra of the surface of the magnetic layer 43 is favorably 1.0 nm or more, and more favorably 1.2 nm or more. When the lower limit value of the arithmetic average roughness Ra of the surface of the magnetic layer 43 is 1.0 nm or more, it is possible to suppress deterioration of the traveling property due to an increase in friction.

The arithmetic average roughness Ra can be obtained as follows. First, the surface of the magnetic layer 43 is observed by an atomic force microscope (AFM) to obtain an AFM image of 40 μm×40 μm. Nano Scope IIIa D3100 manufactured by Digital Instruments is used as the AFM, one formed of silicon single crystal is used as a cantilever (Note 1), and measurement is performed by turning at 200 to 400 Hz as the tapping frequency. Next, the AFM image is divided into 512×512 (=262,144) measurement points, a height Z(i) (i: measurement point numbers, i=1 to 262,144) is measured at each measurement point, and the heights Z(i) at the respective measurement points are simply averaged (arithmetically averaged) to obtain an average height (average surface) Zave (=(Z(1)+Z(2)+ . . . +Z(262,144))/262, 144). Subsequently, a deviation Z"(i) from an average center line at each measurement point (=Z(i)−Zave) is obtained to calculate the arithmetic average roughness Ra [nm] (=(Z"(1)+Z"(2)+ . . . +Z"(262,144))/262,144). At this time, one that has been subjected to filtering by second-order Flatten and third-order planefit in XY as image processing is used as data.

(Note 1) SPM probe NCH of a normal type, POINT-PROBE manufactured by NanoWorld
L (cantilever length)=125 μm The upper limit value of an average thickness $t_m$ of the magnetic layer 43 is 80 nm or less, favorably 70 nm or less, and more favorably 50 nm or less. When the upper limit value of the average thickness t m of the magnetic layer 43 is 80 nm or less, the influence of the demagnetizing field can be reduced in the case where a ring-type head is used as the recording head, and thus, more excellent electromagnetic conversion characteristics can be achieved.

The lower limit value of the average thickness t m of the magnetic layer 43 is favorably 35 nm or more. When the lower limit value of the average thickness t m of the magnetic layer 43 is 35 nm or more, the output can be ensured in the case where an MR-type head is used as the reproduction head, and thus, more excellent electromagnetic conversion characteristics can be achieved.

The average thickness t m of the magnetic layer 43 is obtained as follows. First, the magnetic tape 22 to be measured is processed by an FIB method or the like to obtain a slice. In the case of using an FIB method, a carbon layer and a tungsten layer are formed as protective films as pre-processing for observing a TEM image of a cross section described below. The carbon layer is formed on each of the surfaces of the magnetic tape 22 on the side of the magnetic layer 43 and on the side of the back layer 44 by a vapor deposition method and the tungsten layer is further formed on the surface on the side of the magnetic layer 43 by a vapor deposition method or a sputtering method. The slicing is performed in a length direction (longitudinal direction) of the magnetic tape 22. That is, the slicing forms a cross section parallel to both the longitudinal direction and the thickness direction of the magnetic tape 22.

The cross section described above of the obtained sliced sample is observed through a transmissionelectron microscope (TEM) under the following conditions to obtain a TEM image. Note that the magnification and the acceleration voltage may be adjusted as appropriately in accordance with the type of apparatus.

Apparatus: TEM (H9000NAR manufactured by Hitachi, Ltd.)
Acceleration voltage: 300 kV
Magnification: 100,000 times Next, the thickness of the magnetic layer 43 is measured at at least ten or more positions of the magnetic tape 22 in the longitudinal direction using the obtained TEM image. The average value obtained by simply averaging (arithmetically averaging) the obtained measured values is used as the average thickness t m [nm] of the magnetic layer 43. Note that the positions where the measurement described above is performed are randomly selected from the test piece.
(Magnetic Powder)

The magnetic powder includes a plurality of magnetic particles. The magnetic particles are, for example, particles including hexagonal ferrite (hereinafter, referred to as "hexagonal ferrite particles"), particles including epsilon-iron oxide (s-iron oxide) (hereinafter, referred to as "ε-iron oxide particles"), or particles including Co-containing spinel ferrite (hereinafter, referred to as "cobalt ferrite particles"). The magnetic powder is favorably crystal-oriented preferentially in the thickness direction of the magnetic tape 22 (perpendicular direction).
(Hexagonal Ferrite Particles)

Each of the hexagonal ferrite particles has a plate shape such as a hexagonal plate shape. In this specification, the hexagonal plate shape includes a substantially hexagonal plate shape. The hexagonal ferrite contains favorably at least one of Ba, Sr, Pb, or Ca, and more favorably at least one of Ba or Sr. The hexagonal ferrite may specifically be barium ferrite or strontium ferrite, for example. The barium ferrite may further contain at least one of Sr, Pb, or Ca in addition to Ba. The strontium ferrite may further contain at least one of Ba, Pb, or Ca in addition to Sr.

More specifically, the hexagonal ferrite has an average composition represented by a general formula of $MFe_{12}O_{19}$. However, M is, for example, at least one metal of Ba, Sr, Pb, or Ca, and favorably at least one metal of Ba or Sr. M may be a combination of Ba and one or more metals selected from the group consisting of Sr, Pb, and Ca. Further, M may be a combination of Sr and one or more metals selected from the group consisting of Ba, Pb, and Ca. In the general formula described above, some Fes may be substituted by another metal element.

In the case where the magnetic powder includes powder of the hexagonal ferrite particles, the average particle size of the magnetic powder is favorably 30 nm or less, more favorably 12 nm or more and 25 nm or less, still more favorably 12 nm or more and 22 nm or less, particularly favorably 12 nm or more and 19 nm or less, and most favorably 12 nm or more and 16 nm or less. When the average particle size of the magnetic powder is 30 nm or less, more excellent electromagnetic conversion characteristics (e.g., SNR) can be achieved in the magnetic tape 22 having high recording density. Meanwhile, when the average particle size of the magnetic powder is 12 nm or more, the dispersibility of the magnetic powder is further improved and further excellent electromagnetic conversion characteristics (e.g., SNR) can be achieved.

The average aspect ratio of the magnetic powder is favorably 1.0 or more and 3.0 or less, more favorably 1.3 or more and 2.8 or less, and still more favorably 1.6 or more and 2.7 or less. When the average aspect ratio of the magnetic powder is within a range of 1.0 or more and 2.5 or less, agglomeration of the magnetic powder can be suppressed. Further, the resistance applied to the magnetic powder when perpendicularly orienting the magnetic powder in the process of forming the magnetic layer 43 can be suppressed. Therefore, it is possible to improve the perpendicular orientation property of the magnetic powder.

In the case where the magnetic powder includes powder of the hexagonal ferrite particles, the average particle size and the average aspect ratio of the magnetic powder are obtained as follows. First, the magnetic tape 22 to be measured is processed by an FIB method or the like to obtain a slice. In the case of using an FIB method, a carbon layer and a tungsten layer are formed as protective films as pre-processing for observing a TEM image of a cross section described below. The carbon layer is formed on each of the surfaces of the magnetic tape 22 on the side of the magnetic layer 43 and on the side of the back layer 44 by a vapor deposition method and the tungsten layer is further formed on the surface on the side of the magnetic layer 43 by a vapor deposition method or a sputtering method. The slicing is performed in a length direction (longitudinal direction) of the magnetic tape 22. That is, the slicing forms a cross section parallel to both the longitudinal direction and the thickness direction of the magnetic tape 22.

A transmission electron microscope (H-9500 manufactured by Hitachi High-Technologies Corporation) is used for observing the cross section described above of the obtained slice sample such that the entire magnetic layer 43 is included with respect to the thickness direction of the magnetic layer 43 at the acceleration voltage: 200 kV and the total magnification: 500,000 times to take a TEM photograph. Next, 50 particles, which have the side surface in the direction of the observation surface and have the thickness that can be clearly checked, are selected from the taken TEM photograph. A maximum plate thickness DA of each of the selected 50 particles, which have the thickness that can be clearly checked, is measured. The maximum plate thicknesses DA obtained in this way are simply averaged (arithmetically averaged) to obtain an average maximum plate thickness $DA_{ave}$. Subsequently, a plate diameter DB of each magnetic powder is measured. In order to measure the plate diameter DB of the particle, 50 particles whose plate diameter can be clearly checked are selected from the taken TEM photograph. The plate diameter DB of each of the selected 50 particles is measured. The plate diameters DB obtained in this way are simply averaged (arithmetically averaged) to obtain an average plate diameter $DB_{ave}$. The average plate diameter $DB_{ave}$ is the average particle size. Then, an average aspect ratio ($DB_{ave}/DA_{ave}$) of the particles is obtained on the basis of the average maximum plate thickness $DA_{ave}$ and the average plate diameter $DB_{ave}$.

In the case where the magnetic powder includes powder of the hexagonal ferrite particles, the average particle volume of the magnetic powder is favorably 3400 nm³ or less, more favorably 400 nm³ or more and 2600 nm³ or less, still more favorably 400 nm³ or more and 1700 nm³ or less, particularly favorably 400 nm³ or more and 1200 nm³ or less, and most favorably 400 nm³ or more and 1000 nm³ or less. When the average particle volume of the magnetic powder is 3400 nm³ or less, an effect similar to that in the case where the average particle size of the magnetic powder is 25 nm or less can be achieved. Meanwhile, when the average particle volume of the magnetic powder is 500 nm³ or more, an effect similar to that in the case where the average particle size of the magnetic powder is 12 nm or more can be achieved.

The average particle volume of the magnetic powder is obtained as follows. First, as described above with respect to the method of calculating the average particle size of the magnetic powder, the average major axis length $DA_{ave}$ and the average plate diameter $DB_{ave}$ are obtained. Next, an average volume V of the magnetic powder is obtained in accordance with the following formula.

$$V = \frac{3\sqrt{3}}{8} \times DA_{ave} \times DB_{ave} \times DB_{ave} \quad \text{[Math. 1]}$$

(ε-Iron Oxide Particles)

The ε-iron oxide particles are hard magnetic particles capable of achieving a high coercive force even as minute particles. The ε-iron oxide particles each have a spherical shape or a cubic shape. In this specification, the spherical shape includes a substantially spherical shape. Further, the cubic shape includes a substantially cubic shape. Since the ε-iron oxide particles have the shape as described above, it is possible to reduce the contact area of the particles in the thickness direction of the magnetic tape 22 and suppress agglomeration of the particles in the case where the ε-iron oxide particles are used as the magnetic particles, as compared with the case where barium ferrite particles having a hexagonal plate shape are used as the magnetic particles. Therefore, it is possible to enhance the dispersibility of the magnetic powder and achieve further excellent electromagnetic conversion characteristics (e.g., SNR).

Each of the ε-iron oxide particles has a core-shell structure. Specifically, the ε-iron oxide particle includes a core portion and a shell portion having a two-layer structure provided around the core portion. The shell portion having the two-layer structure includes a first shell portion provided on the core portion and a second shell portion provided on the first shell portion.

The core portion contains ε-iron oxide. The ε-iron oxide contained in the core portion is favorably one having ε-$Fe_2O_3$ crystals as the main phase, and more favorably one formed of single-phase ε-$Fe_2O_3$.

The first shell portion covers at least part of the periphery of the core portion. Specifically, the first shell portion may partially cover the periphery of the core portion or may entirely cover the periphery of the core portion. It is favorable that the first shell portion covers the entire surface of the core portion from the viewpoint of making the exchange coupling between the core portion and the first shell portion sufficient and improving the magnetic properties.

The first shell portion is a so-called soft magnetic layer and includes a soft magnetic material such as α-Fe, a Ni—Fe alloy, and an Fe—Si—Al alloy. The α-Fe may be obtained by reducing the ε-iron oxide contained in the core portion.

The second shell portion is an oxide film as an antioxidant layer. The second shell portion contains α-iron oxide, aluminum oxide, or silicon oxide. The α-iron oxide contains, for example, at least one iron oxide of $Fe_3O_4$, $Fe_2O_3$, and FeO. In the case where the first shell portion contains α-Fe (soft magnetic material), the α-iron oxide may be obtained by oxidizing α-Fe contained in the first shell portion.

Since the ε-iron oxide particle includes the first shell portion as described above, it is possible to adjust a coercive force Hc of the entire ε-iron oxide particles (core-shell particles) to the coercive force Hc suitable for recording while maintain the coercive force Hc of the core portion alone at a large value for achieving thermal stability. Further, since the ε-iron oxide particle includes the second shell portion as described above, it is possible to suppress deterioration of the properties of the ε-iron oxide particles due to the ε-iron oxide particles being exposed to the air and the surfaces of the particles being rusted in the process of producing the magnetic tape 22 and before the process. Therefore, it is possible to suppress deterioration of the properties of the magnetic tape 22.

The ε-iron oxide particle may include a shell portion having a single-layer structure. In this case, the shell portion has a configuration similar to that of the first shell portion. However, from the viewpoint of suppressing deterioration of the properties of the ε-iron oxide particles, it is favorable that the ε-iron oxide particle includes the shell portion having a two-layer structure, as described above.

The ε-iron oxide particles may include an additive instead of the core-shell structure described above or may include an additive while having the core-shell structure. In this case, some Fes of the ε-iron oxide particles is substituted by the additive. Also with the ε-iron oxide particles including the additive, the coercive force Hc of the entire ε-iron oxide particles can be adjusted to the coercive force Hc suitable for recording, and thus, it is possible to improve the easiness of recording. The additive is a metal element other than iron, favorably a trivalent metal element, more favorably at least one of Al, Ga, or In, and sill more favorably at least one of Al or Ga.

Specifically, the ε-iron oxide including the additive is ε-Fe$_{2-x}$M$_x$O$_3$ crystals (where M is a metal element other than iron, favorably a trivalent metal element, more favorably at least one of Al, Ga, or In, and still more favorably at least one of Al or Ga. x is, for example, 0<x<1.).

The average particle size (average maximum particle size) of the magnetic powder is, for example, 22 nm or less. The average particle size (average maximum particle size) of the magnetic powder is favorably 20 nm or less, more favorably 8 nm or more and 20 nm or less, still more favorably 10 nm or more and 18 nm or less, particularly favorably 10 nm or more and 16 nm or less, and most favorably 10 nm or more and 14 nm or less. In the magnetic tape 22, a region having a size of ½ of the recording wavelength is an actual magnetized region. For this reason, by setting the average particle size of the magnetic powder to half or less of the shortest recording wavelength, it is possible to achieve more excellent electromagnetic conversion characteristics (e.g., SNR). Therefore, in the case where the average particle size of the magnetic powder is 22 nm or less, it is possible to achieve more excellent electromagnetic conversion characteristics (e.g., SNR) in the magnetic tape 22 having high recording density (e.g., the magnetic tape 22 configured to be capable of recording a signal at the shortest recording wavelength of 44 nm or less). Meanwhile, when the average particle size of the magnetic powder is 8 nm or more, the dispersibility of the magnetic powder is further improved and it is possible to achieve more excellent electromagnetic conversion characteristics (e.g., SNR).

The average aspect ratio of the magnetic powder is favorably 1.0 or more and 3.0 or less, more favorably 1.0 or more and 2.5 or less, still more favorably 1.0 or more and 2.1 or less, and particularly favorably 1.0 or more and 1.8 or less. When the average aspect ratio of the magnetic powder is within a range of 1.0 or more and 3.0 or less, it is possible to suppress agglomeration of the magnetic powder. Further, the resistance applied to the magnetic powder when perpendicularly orienting the magnetic powder in the process of forming the magnetic layer 43 can be suppressed. Therefore, it is possible to improve the perpendicular orientation property of the magnetic powder.

In the case where the magnetic powder includes powder of the ε-iron oxide particles, the average particle size and the average aspect ratio of the magnetic powder are obtained as follows. First, the magnetic tape 22 to be measured is processed by an FIB (Focused Ion Beam) method or the like to obtain a slice. In the case of using an FIB method, a carbon layer and a tungsten layer are formed as protective layers as pre-processing for observing a TEM image of a cross section described below. The carbon layer is formed on each of the surfaces of the magnetic tape 22 on the side of the magnetic layer 43 and on the side of the back layer 44 by a vapor deposition method and the tungsten layer is further formed on the surface on the side of the magnetic layer 43 by a vapor deposition method or a sputtering method. The slicing is performed in a length direction (longitudinal direction) of the magnetic tape 22. That is, the slicing forms a cross section parallel to both the longitudinal direction and the thickness direction of the magnetic tape 22.

A transmission electron microscope (H-9500 manufactured by Hitachi High-Technologies Corporation) is used for observing the cross section described above of the obtained slice sample such that the entire magnetic layer 43 is included with respect to the thickness direction of the magnetic layer 43 at the acceleration voltage: 200 kV and the total magnification: 500,000 times to take a TEM photograph. Next, 50 particles, which have the shape that can be clearly checked, are selected from the taken TEM photograph, and a long-axis length DL and a short-axis length DS of each particle are measured. Here, the long-axis length DL means the maximum one (so-called maximum Feret diameter) of distances between two parallel lines drawn at any angle so as to be in contact with the outline of each particle. Meanwhile, the short-axis length DS means the maximum one of particle lengths in a direction orthogonal to a long axis (DL) of the particle. Subsequently, the measured long-axis lengths DL of the 50 particles are simply averaged (arithmetically averaged) to obtain an average major axis length DL$_{ave}$. The average major axis length DL ave obtained in this way is used as the average particle size of the magnetic powder. Further, the measured short-axis lengths DS of the 50 particles are simply averaged (arithmetically averaged) to obtain an average short-axis length DS$_{ave}$. Then, an average aspect ratio (DL$_{ave}$/DS$_{ave}$) of the particles is obtained on the basis of the average major axis length DL ave and the average short-axis length DS$_{ave}$.

The average particle volume of the magnetic powder is favorably 5600 nm$^3$ or less, more favorably 250 nm$^3$ or more and 4200 nm$^3$ or less, still more favorably 600 nm$^3$ or more and 3000 nm$^3$ or less, particularly favorably 600 nm$^3$ or more and 2200 nm$^3$ or less, and most favorably 600 nm$^3$ or more and 1500 nm$^3$ or less. Since noise of the magnetic tape 22 is generally inversely proportional to the square root of the number of particles (i.e., proportional to the square root of the particle volume), it is possible to achieve more excellent electromagnetic conversion characteristics (e.g., SNR) by making the particle volume smaller. Therefore, when the average particle volume of the magnetic powder is 5600 nm$^3$ or less, it is possible to achieve more excellent electromagnetic conversion characteristics (e.g., SNR) as in the case where the average particle size of the magnetic powder is 22 nm or less. Meanwhile, when the particle volume of the magnetic powder is 250 nm$^3$ or more, an effect similar to that in the case where the average particle size of the magnetic powder is 8 nm or more can be achieved.

In the case where the ε-iron oxide particles each have a spherical shape, the average particle volume of the magnetic powder is obtained as follows. First, the average major axis length $DL_{ave}$, is obtained in a way similar to the method of calculating the average particle size of the magnetic powder described above. Next, the average volume V of the magnetic powder is obtained in accordance with the following formula.

$$V=(\pi/6) \times DL_{ave}^3$$

In the case where the ε-iron oxide particles each have a cubic shape, the average volume of the magnetic powder can be obtained as follows. The magnetic tape 22 is processed by an FIB (Focused Ion Beam) method or the like to obtain a slice. In the case of using an FIB method, a carbon film and a tungsten thin film are formed as protective films as pre-processing for observing a TEM image of a cross section described below. The carbon film is formed on each of the surfaces of the magnetic tape 22 on the side of the magnetic layer 43 and on the side of the back layer 44 by a vapor deposition method and the tungsten thin film is further formed on the surface on the side of the magnetic layer 43 by a vapor deposition method or a sputtering method. The slicing is performed in a length direction (longitudinal direction) of the magnetic tape 22. That is, the slicing forms a cross section parallel to both the longitudinal direction and the thickness direction of the magnetic tape 22.

A transmission electron microscope (H-9500 manufactured by Hitachi High-Technologies Corporation) is used for observing the cross section of the obtained slice sample such that the entire magnetic layer 43 is included with respect to the thickness direction of the magnetic layer 43 at the acceleration voltage: 200 kV and the total magnification: 500,000 times to take a TEM photograph. Note that the magnification and the acceleration voltage may be adjusted as appropriate in accordance with the type of apparatus. Next, 50 particles, which have a clear shape, are selected from the taken TEM photograph, and a length DC of a side of each particle is measured. Subsequently, the measured lengths DC of the 50 particles are simply averaged (arithmetically averaged) to obtain an average side length $DC_{ave}$. Next, an average volume V ave (particle volume) of the magnetic powder is obtained on the basis of the following formula by using the average side length $DC_{ave}$.

$$V_{ave}=DC_{ave}^3$$

(Cobalt Ferrite Particles)

It is favorable that the cobalt ferrite particles each have uniaxial crystal anisotropy. Since the cobalt ferrite particle has uniaxial crystal anisotropy, it is possible to make the magnetic powder preferentially crystal-oriented in the thickness direction (perpendicular direction) of the magnetic tape 22. The cobalt ferrite particle has, for example, a cubic shape. In this specification, the cubic shape includes a substantially cubic shape. The Co-containing spinel ferrite may further contain at least one of Ni, Mn, Al, Cu, or Zn in addition to Co.

The Co-containing spinel ferrite has an average composition represented by the following formula, for example.

(where M is, for example, at least one metal of Ni, Mn, Al, Cu, or Zn. x is a value in a range of $0.4 \leq x \leq 1.0$. y is a value in a range of $0 \leq y \leq 0.3$. However, x and y satisfy the relationship of $(x+y) \leq 1.0$. z is a value in a range of $3 \leq z \leq 4$. Some Fes may be substituted by another metal element.)

In the case where the magnetic powder includes powder of the cobalt ferrite particles, the average particle size of the magnetic powder is 22 nm or less. The average particle size (average maximum particle size) of the magnetic powder is favorably 20 nm or less, more favorably 8 nm or more and 20 nm or less, still more favorably 10 nm or more and 18 nm or less, particularly favorably 10 nm or more and 16 nm or less, and most favorably 10 nm or more and 14 nm or less. When the average particle size of the magnetic powder is 22 nm or less, it is possible to achieve more excellent electromagnetic conversion characteristics (e.g., SNR) in the magnetic tape 22 having high recording density. Meanwhile, when the average particle size of the magnetic powder is 8 nm or more, the dispersibility of the magnetic powder is further improved, and it is possible to achieve more excellent electromagnetic conversion characteristics (e.g., SNR). The method of calculating the average particle size of the magnetic powder is similar to the method of calculating the average particle size of the magnetic powder in the case where the magnetic powder includes powder of the ε-iron oxide particles.

The average aspect ratio of the magnetic powder is favorably 1.0 or more and 3.0 or less, more favorably 1.0 or more and 2.5 or less, still more favorably 1.0 or more and 2.1 or less, and particularly favorably 1.0 or more and 1.8 or less. When the average aspect ratio of the magnetic powder is within a range of 1.0 or more and 3.0 or less, it is possible to suppress agglomeration of the magnetic powder. Further, the resistance applied to the magnetic powder when perpendicularly orienting the magnetic powder in the process of forming the magnetic layer 43 can be suppressed. Therefore, it is possible to improve the perpendicular orientation property of the magnetic powder. The method of calculating the average aspect ratio of the magnetic powder is similar to the method of calculating the average aspect ratio of the magnetic powder in the case where the magnetic powder includes powder of the ε-iron oxide particles.

The average particle volume of the magnetic powder is favorably 5600 $nm^3$ or less, more favorably 250 $nm^3$ or more and 4200 $nm^3$ or less, still more favorably 600 $nm^3$ or more and 3000 $nm^3$ or less, particularly favorably 600 $nm^3$ or more and 2200 $nm^3$ or less, and most favorably 600 $nm^3$ or more and 1500 $nm^3$ or less. When the average particle volume of the magnetic powder is 5600 $nm^3$ or less, an effect similar that in the case where the average particle size of the magnetic powder is 25 nm or less can be achieved. Meanwhile, when the average particle volume of the magnetic powder is 500 $nm^3$ or more, an effect similar to that in the case where the average particle size of the magnetic powder is 8 nm or more can be achieved. The method of calculating the average particle volume of the magnetic powder is similar to the method of calculating the average particle volume in the case where the ε-iron oxide particle has a cubic shape.

(Binder)

Examples of the binder include a thermoplastic resin, a thermosetting resin, and a reactive resin. Examples of the thermoplastic resin include vinyl chloride, vinyl acetate, a vinyl chloride-vinyl acetate copolymer, a vinyl chloride-vinylidene chloride copolymer, a vinyl chloride-acrylonitrile copolymer, an acrylic acid ester-acrylonitrile copolymer, an acrylic acid ester-vinyl chloride-vinylidene chloride copolymer, an acrylic acid ester-acrylonitrile copolymer, an acrylic acid ester-vinylidene chloride copolymer, a methacrylic acid ester-vinylidene chloride copolymer, a methacrylic acid ester-vinyl chloride copolymer, a methacrylic acid ester-ethylene copolymer, polyvinyl fluoride, a vinylidene chloride-acrylonitrile copolymer, an acrylonitrile-butadiene copolymer, a polyamide resin, polyvinyl butyral, a cellulose derivative (cellulose acetate butyrate, cellulose diacetate, cellulose triacetate, cellulose propionate, nitrocellulose), a styrene butadiene copolymer, a polyurethane resin, a polyester resin, an amino resin, and synthetic rubber.

Examples of the thermosetting resin include a phenolic resin, an epoxy resin, a polyurethane curable resin, a urea resin, a melamine resin, an alkyd resin, a silicone resin, a polyamine resin, and a urea-formaldehyde resin.

For the purpose of improving the dispersibility of the magnetic powder, —SO$_3$M, —OSO$_3$M, —COOM, P=O(OM)$_2$ (where M represents a hydrogen atom or an alkali metal such as lithium, potassium, and sodium), a side chain amine having a terminal group represented by —NR1R2, —NR1R2R3$^+$X$^-$, a main chain amine represented by >NR1R2$^+$X$^-$ (where R1, R2, and R3 each represent a hydrogen atom or a hydrocarbon group, and X$^-$ represents a halogen element ion such as fluorine, chlorine, bromine, and iodine, an inorganic ion, or an organic ion), and a polar functional group such as —OH, —SH, —CN, and an epoxy group may be introduced into all the binders described above. The amount of the polar functional groups introduced into the binders is favorably $10^{-1}$ to $10^{-8}$ mol/g, and more favorably $10^{-2}$ to $10^{-6}$ mol/g.

(Lubricant)

The lubricant contains, for example, at least one of a fatty acid or a fatty acid ester, and favorably both a fatty acid and a fatty acid ester. Containing a lubricant in the magnetic layer 43, particularly, containing both a fatty acid and a fatty acid ester in the magnetic layer 43, contributes to improving the travelling stability of the magnetic tape 22. More particularly, when the magnetic layer 43 contains a lubricant and has a pore, favorable travelling stability can be achieved. It is conceivable that the improvement in the travelling stability can be achieved because the dynamic friction coefficient of the surface of the magnetic tape 22 on the side of the magnetic layer 43 is adjusted to the value suitable for travelling of the magnetic tape 22 by the lubricant described above.

The fatty acid may favorably be a compound represented by the following general formula (1) or (2). For example, one of the compound represented by the following general formula (1) and the compound represented by the general formula (2) may be contained as a fatty acid, or both of them may be contained.

Further, the fatty acid ester may favorably be a compound represented by the following general formula (3) or (4). For example, one of the compound represented by the following general formula (3) and the compound represented by the general formula (4) may be contained as the fatty acid ester, or both of them may be contained.

When the lubricant contains one or both of the compound represented by the general formula (1) and the compound represented by the general formula (2) and one or both of the compound represented by the general formula (3) and the compound represented by the general formula (4), it is possible to suppress an increase in dynamic friction coefficient due to repeated recording or reproduction of the magnetic tape 22.

$$CH_3(CH_2)_k COOH \quad (1)$$

(However, in the general formula (1), k is an integer selected from a range of 14 or more and 22 or less, and more favorably a range of 14 or more and 18 or less.)

$$CH_3(CH_2)_n CH=CH(CH_2)_m COOH \quad (2)$$

(However, in the general formula (2), the sum of n and m is an integer selected from a range of 12 or more and 20 or less, and more favorably a range of 14 or more and 18 or less.)

$$CH_3(CH_2)_p COO(CH_2)_q CH_3 \quad (3)$$

(However, in the general formula (3), p is an integer selected from a range of 14 or more and 22 or less, and more favorably a range of 14 or more and 18 or less, and q is an integer selected from a range of 2 or more and 5 or less, and more favorably a range of 2 or more and 4 or less.)

$$CH_3(CH_2)_r COO—(CH_2)_s CH(CH_3)_2 \quad (4)$$

(However, in the general formula (4), r is an integer selected from a range of 14 or more and 22 or less, and s is an integer selected from a range of 1 or more and 3 or less.)

(Antistatic Agent)

Examples of the antistatic agent include carbon black, natural surfactant, nonionic surfactant, and cationic surfactant.

(Abrasive)

Examples of the abrasive include α-alumina, β-alumina, and γ-alumina having an α-transformation rate of 90% or more, silicon carbide, chromium oxide, cerium oxide, α-iron oxide, corundum, silicon nitride, titanium carbide, titanium oxide, silicon dioxide, tin oxide, magnesium oxide, tungsten oxide, zirconium oxide, boron nitride, zinc oxide, calcium carbonate, calcium sulfate, barium sulfate, molybdenum disulfide, acicular α-iron oxide obtained by dehydrating a raw material of magnetic iron oxide and performing annealing treatment thereon, and those obtained by performing surface treatment on them with aluminum and/or silica as necessary.

(Curing Agent)

Examples of the curing agent include a polyisocyanate. Examples of the polyisocyanate include an aromatic polyisocyanate such as an adduct of tolylene diisocyanate (TDI) and an active hydrogen compound, and an aliphatic polyisocyanate such as an adduct of hexamethylene diisocyanate (HMDI) and an active hydrogen compound. The weight average molecular weight of the polyisocyanates is desirably in a range of 100 to 3000.

(Rust Inhibitor)

Examples of the rust inhibitor include phenols, naphthols, quinones, a heterocyclic compound containing a nitrogen atom, a heterocyclic compound containing an oxygen atom, and a heterocyclic compound containing a sulfur atom.

(Non-Magnetic Reinforcing Particle)

Examples of the non-magnetic reinforcing particle include aluminum oxide (α, β, or γ alumina), chromium oxide, silicon oxide, diamond, garnet, emery, boron nitride, titanium carbide, silicon carbide, titanium carbide, and titanium oxide (rutile or anatase titanium oxide).

(Underlayer)

The underlayer 42 is for reducing the recesses and projections on the surface of the base material 41 and adjusting the recesses and projections on the surface of the magnetic layer 43. The underlayer 42 is a non-magnetic layer containing a non-magnetic powder, a binder, and a lubricant. The underlayer 42 supplies the lubricant to the surface of the magnetic layer 43. The underlayer 42 may further contain at least one additive of an antistatic agent, a curing agent, a rust inhibitor, or the like as necessary.

The average thickness of the underlayer 42 is favorably 0.3 μm or more and 2.0 μm or less, and more favorably 0.5 μm or more and 1.4 μm or less. Note that the average thickness of the underlayer 42 is obtained in a way similar to that for the average thickness of the magnetic layer 43. However, the magnification of the TEM image is adjusted as appropriate in accordance with the thickness of the underlayer 42. When the average thickness of the underlayer 42 is 2.0 μm or less, the stretchability of the magnetic tape 22 due to external force further increases, and thus, adjustment of the width of the magnetic tape 22 by tension adjustment becomes easier.

(Non-Magnetic Powder)

The non-magnetic powder includes, for example, at least one of inorganic particle powder or organic particle powder. Further, the non-magnetic powder may include carbon powder such as carbon black. Note that one type of non-magnetic powder may be used alone or two or more types of non-magnetic powder may be used in combination. The inorganic particles contain, for example, a metal, a metal oxide, a metal carbonate, a metal sulfate, a metal nitride, a metal carbide, a metal sulfide, or the like. Examples of the shape of the non-magnetic powder include, but not limited to, various shapes such as a needle shape, a spherical shape, a cubic shape, and a plate shape.

(Binder and Lubricant)

The binder and the lubricant are similar to those of the magnetic layer 43 described above.

(Additive)

The antistatic agent, the curing agent, and the rust inhibitor are similar to those of the magnetic layer 43 described above.

(Back Layer)

The back layer 44 contains a binder and non-magnetic powder. The back layer 44 may further contain at least one additive of a lubricant, a curing agent, an antistatic agent, or the like as necessary. The binder and the non-magnetic powder are similar to those of the underlayer 42 described above.

The average particle size of the non-magnetic powder is favorably 10 nm or more and 150 nm or less, and more favorably 15 nm or more and 110 nm or less. The average particle size of the non-magnetic powder is obtained in a way similar to that for the average particle size of the magnetic powder described above. The non-magnetic powder may include non-magnetic powder having two or more granularity distributions.

The upper limit value of the average thickness of the back layer 44 is favorably 0.6 μm or less. When the upper limit value of the average thickness of the back layer 44 is 0.6 μm or less, the underlayer 42 and the base material 41 can be kept thick even in the case where the average thickness of the magnetic tape 22 is 5.6 μm or less, and thus, it is possible to maintain the travelling stability of the magnetic tape 22 in the recording/reproduction apparatus. The lower limit value of the average thickness of the back layer 44 is not particularly limited, but is, for example, 0.2 μm or more.

An average thickness $t_b$ of the back layer 44 is obtained as follows. First, an average thickness $t_T$ of the magnetic tape 22 is measured. The measurement method of the average thickness $t_T$ is as described in the following "Average thickness of magnetic tape". Subsequently, the back layer 44 of the sample is removed with a solvent such as MEK (methyl ethyl ketone) and dilute hydrochloric acid. Next, a Laser Hologage (LGH-110C) manufactured by Mitutoyo Corporation is used to measure the thickness of the sample at five or more positions, and the measured values are simply averaged (arithmetically averaged) to calculate an average value $t_B$ [μm]. After that, the average thickness $t_b$ [μm] of the back layer 44 is obtained in accordance with the following formula. Note that the measurement positions are randomly selected from the sample.

$$t_b[\mu m] = t_T[\mu m] - t_B[\mu m]$$

The back layer 44 has a surface provided with numerous protruding portions. The numerous protruding portions are for forming numerous hole portions in the surface of the magnetic layer 43 under a state in which the magnetic tape 22 has been wound in a roll shape. The numerous hole portions are formed by numerous non-magnetic particles protruding from the surface of the back layer 44, for example.

(Average Thickness of Magnetic Tape)

The upper limit value of the average thickness (average total thickness) $t_T$ of the magnetic tape 22 is 5.6 μm or less, favorably 5.0 μm or less, more favorably 4.6 μm or less, and still more favorably 4.4 μm or less. When the average thickness $t_T$ of the magnetic tape 22 is 5.6 μm or less, it is possible to make the recording capacity of a single data cartridge larger than that of a general magnetic tape. The lower limit value of the average thickness $t_T$ of the magnetic tape 22 is not particularly limited, but is, for example, 3.5 μm or more. Note that the total length of the magnetic tape 22 is 960 m or more.

The average thickness $t_T$ of the magnetic tape 22 is obtained as follows. First, the magnetic tape 22 having a width of ½ inch is prepared and cut into a length of 250 mm to prepare a sample. Next, a Laser Hologage (LGH-110C) manufactured by Mitutoyo Corporation is used as a measuring apparatus to measure the thickness of the sample at five or more positions, and the measured values are simply averaged (arithmetically averaged) to calculate an average value $t_T$ [μm]. Note that the measurement positions are randomly selected from the sample.

(Coercive Force Hc)

The upper limit value of a coercive force Hc2 of the magnetic layer 43 in the longitudinal direction of the magnetic tape 22 is favorably 2000 Oe or less, more favorably 1900 Oe or less, and still more favorably 1800 Oe or less. When the coercive force Hc2 of the magnetic layer 43 in the longitudinal direction is 2000 Oe or less, sufficient electromagnetic conversion characteristics can be provided even with high recording density.

The lower limit value of the coercive force Hc2 of the magnetic layer 43 measured in the longitudinal direction of the magnetic tape 22 is favorably 1000 Oe or more. When the coercive force Hc2 of the magnetic layer 43 measured in the longitudinal direction is 1000 Oe or more, it is possible to suppress demagnetization due to leakage flux from the recording head.

The coercive force Hc2 described above is obtained as follows. First, three magnetic tapes 22 are superimposed with double sided tape, and then punched out with a punch of φ6.39 mm to prepare a measurement sample. At this time, marking is performed with arbitrary non-magnetic ink such that the longitudinal direction (travelling direction) of the magnetic tape 22 can be recognized. Then, a vibrating sample magnetometer (VSM) is used to measure the M-H loop of the measurement sample (the entire magnetic tape 22) corresponding to the longitudinal direction (travelling direction) of the magnetic tape 22. Next, acetone, ethanol, or the like is used to wipe off the coating film (the underlayer 42, the magnetic layer 43, the back layer 44, and the like), leaving only the base material 41. Then, three obtained base materials 41 are superimposed with double sided tape, and then punched out with a punch of φ6.39 mm to prepare a sample for background correction (hereinafter, referred to simply as "correction sample"). After that, the M-H loop of the correction sample (base material 41) corresponding to the perpendicular direction of the base material 41 (perpendicular direction of the magnetic tape 22) is measured using the VSM.

In the measurement of the M-H loop of the measurement sample (the entire magnetic tape 22) and the M-H loop of the correction sample (base material 41), a High Sensitivity Vibrating Sample Magnetometer "VSM-P7-15" manufactured by TOEI INDUSTRY CO., LTD. is used. The measurement conditions are the measurement mode: full-loop, the maximum magnetic field: 15 kOe, the magnetic field step: 40 bits, the time constant of locking amp: 0.3 sec, the waiting time: 1 sec, and the MH average number: 20.

After the M-H loop of the measurement sample (the entire magnetic tape 22) and the M-H loop of the correction sample (base material 41) are obtained, the M-H loop of the correction sample (base material 41) is subtracted from the M-H loop of the measurement sample (the entire magnetic tape 22) to perform background correction, thereby obtaining the M-H loop after background correction. A measurement/analysis program attached to the "VSM-P7-15" is used for this calculation of background correction. The coercive force Hc2 is obtained on the basis of the obtained M-H loop after background correction. Note that the measurement/analysis program attached to the "VSM-P7-15" is used for this calculation. Note that the measurement of the M-H loop described above is performed at 25° C. Further, the "demagnetizing field correction" in measuring the M-H loop in the longitudinal direction of the magnetic tape 22 is not performed.

(Squareness Ratio)

A squareness ratio S1 of the magnetic layer 43 in the perpendicular direction (thickness direction) of the magnetic tape 22 is favorably 65% or more, more favorably 70% or more, still more favorably 75% or more, particularly favorably 80% or more, and most favorably 85% or more. When the squareness ratio S1 is 65% or more, the perpendicular orientation property of the magnetic powder is sufficiently high, and thus, it is possible to achieve more excellent electromagnetic conversion characteristics (e.g., SNR).

The squareness ratio S1 in the perpendicular direction is obtained as follows. First, three magnetic tapes 22 are superimposed with double sided tape, and then punched out with a punch of φ6.39 mm to prepare a measurement sample. At this time, marking is performed with arbitrary non-magnetic ink such that the longitudinal direction (travelling direction) of the magnetic tape 22 can be recognized. Then, the M-H loop of the measurement sample (the entire magnetic tape 22) corresponding to the perpendicular direction (thickness direction) of the magnetic tape 22 is measured using the VSM. Next, acetone, ethanol, or the like is used to wipe off the coating film (the underlayer 42, the magnetic layer 43, the back layer 44, and the like), leaving only the base material 41. Then, three obtained base materials 41 are superimposed with double sided tape, and then punched out with a punch of φ6.39 mm to prepare a sample for background correction (hereinafter, referred to simply as "correction sample"). After that, the M-H loop of the correction sample (base material 41) corresponding to the perpendicular direction of the base material 41 (perpendicular direction of the magnetic tape 22) is measured using the VSM.

In the measurement of the M-H loop of the measurement sample (the entire magnetic tape 22) and the M-H loop of the correction sample (base material 41), a High Sensitivity Vibrating Sample Magnetometer "VSM-P7-15" manufactured by TOEI INDUSTRY CO., LTD. is used. The measurement conditions are the measurement mode: full-loop, the maximum magnetic field: 15 kOe, the magnetic field step: 40 bits, the time constant of locking amp: 0.3 sec, the waiting time: 1 sec, and the MH average number: 20.

After the M-H loop of the measurement sample (the entire magnetic tape 22) and the M-H loop of the correction sample (base material 41) are obtained, the M-H loop of the correction sample (base material 41) is subtracted from the M-H loop of the measurement sample (the entire magnetic tape 22) to perform background correction, thereby obtaining the M-H loop after background correction. The measurement/analysis program attached to the "VSM-P7-15" is used for this calculation of background correction.

A saturation magnetization Ms (emu) and a residual magnetization Mr (emu) of the obtained M-H loop after background correction are substituted into the following formula to calculate the squareness ratio S1 (%). Note that the measurement of the M-H loop described above is performed at 25° C. Further, the "demagnetizing field correction" in measuring the M-H loop in the perpendicular direction of the magnetic tape 22 is not performed. Note that the measurement/analysis program attached to the "VSM-P7-15" is used for this calculation.

$$\text{Squareness ratio } S1(\%) = (Mr/Ms) \times 100$$

A squareness ratio S2 of the magnetic layer 43 in the longitudinal direction (travelling direction) of the magnetic tape 22 is favorably 35% or less, more favorably 30% or less, still more favorably 25% or less, particularly favorably 20% or less, and most favorably 15% or less. When the squareness ratio S2 is 35% or less, the perpendicular orientation property of the magnetic powder is sufficiently high, and thus, it is possible to achieve more excellent electromagnetic conversion characteristics (e.g., SNR).

The squareness ratio S2 in the longitudinal direction is obtained in a way similar to that for the squareness ratio S1 except for measuring the M-H loop in the longitudinal direction (travelling direction) of the magnetic tape 22 and the base material 41.

(Surface Roughness $R_b$ of Back Surface)

A surface roughness $R_b$ of the back surface (surface roughness of the back layer 44) is favorably $R_b \leq 6.0$ [nm]. When the surface roughness $R_b$ of the back surface is within the range described above, it is possible to achieve more excellent electromagnetic conversion characteristics.

Modified Example

Although a tape reel for a tape cartridge conforming to the LTO standard has been described as an example in the above embodiment, the present technology is applicable also to a tape reel for a tape cartridge conforming to the standard other than the LTO standard and a tape cartridge including this.

It should be noted that the present technology may also take the following configurations.

(1) A tape reel, including:
a first flange;
a second flange; and
a reel hub that has a cylindrical shape and includes a first end portion formed integrally with the first flange, a second end portion to which the second flange is bonded, and an outer peripheral surface on which a magnetic tape is wound,
the outer peripheral surface of the reel hub having
a first outer peripheral region expanding in diameter from the first end portion toward the second end portion, and
a second outer peripheral region expanding in diameter from the first outer peripheral region across the second end portion and forming a ridge line portion having a shape projecting radially outward of the reel hub on a boundary between the second outer peripheral region and the first outer peripheral region.

(2) The tape reel according to (1) above, in which the ridge line portion is located closer to the first end portion than a center of a height of the reel hub.

(3) The tape reel according to (1) or (2) above, in which a difference between an outer diameter of the ridge line portion and an outer diameter of the first end portion is 10 µm or more and 50 µm or less, and
a difference between the outer diameter of the first end portion and an outer diameter of the second end portion is 30 µm or more and 90 µm or less.

(4) The tape reel according to (3) above, in which the first flange and the reel hub are a molded body of a composite material of a glass filler contained in a synthetic resin material.

(5) The tape reel according to (4) above, in which the synthetic resin material is a polycarbonate resin, and the content of the glass filler is 10% or more and 20% or less in a weight ratio with respect to the polycarbonate resin.

(6) The tape reel according to any one of (1) to (5) above, in which
the reel hub has a height of approximately 13 mm, and a length from the first end portion to the ridge line portion is 3 mm or more and 5 mm or less.

(7) A tape cartridge, including:
a tape reel that includes a first flange, a second flange, and a reel hub that has a cylindrical shape and includes a first end portion to be connected to the first flange, a second end portion to be connected to the second flange, and an outer peripheral surface on which a magnetic tape is wound,
an outer peripheral surface of the reel hub having
a first outer peripheral region expanding in diameter from the first end portion toward the second end portion, and
a second outer peripheral region expanding in diameter from the first outer peripheral region across the second end portion and forming a ridge line portion having a shape projecting radially outward of the reel hub on a boundary between the second outer peripheral region and the first outer peripheral region.

(8) The tape cartridge according to (7) above, in which a radius difference between the first end portion and the second end portion after preserving the tape cartridge for one week in an environment of a temperature of 49° C. and a relative humidity of 80% while the magnetic tape is wound around the tape reel is 10 µm or less.

(9) The tape reel according to (7) or (8) above, in which the magnetic tape has a thickness of 5.6 µm or less and a length of 960 m or more.

(10) An apparatus for producing a tape reel that includes the tape reel according to claim 1, including:
a first mold for molding an outer peripheral surface of the reel hub; and
a second mold for molding an inner peripheral surface of the reel hub,
the first mold having
a first molding surface configured by a tapered surface forming the first outer peripheral region, and
a second molding surface configured by a cylindrical surface forming the second outer peripheral region.

REFERENCE SIGNS LIST 1 tape cartridge
5 tape reel
6 reel hub
6a lower end portion
6b upper end portion
6d outer peripheral surface
6d1 first outer peripheral region
6d2 second outer peripheral region
6d3 ridge line portion
7 lower flange
8 upper flange
22 magnetic tape

The invention claimed is:

1. A tape reel, comprising:
a first flange;
a second flange; and
a reel hub that has a cylindrical shape and includes a first end portion formed integrally with the first flange, a second end portion to which the second flange is bonded, and an outer peripheral surface on which a magnetic tape is wound,
the outer peripheral surface of the reel hub having
a first outer peripheral region expanding in diameter from the first end portion toward the second end portion, and
a second outer peripheral region expanding in diameter from the first outer peripheral region across the second end portion and forming a ridge line portion having a shape projecting radially outward of the reel hub on a boundary between the second outer peripheral region and the first outer peripheral region,
wherein the ridge line portion is located closer to the first end portion than a center of a height of the reel hub.

2. An apparatus for producing a tape reel that includes the tape reel according to claim 1, comprising:
a first mold for molding the outer peripheral surface of the reel hub; and
a second mold for molding an inner peripheral surface of the reel hub,
the first mold having
a first molding surface configured by a tapered surface forming the first outer peripheral region, and
a second molding surface configured by a cylindrical surface forming the second outer peripheral region.

3. A tape reel, comprising:
a first flange;
a second flange; and
a reel hub that has a cylindrical shape and includes a first end portion formed integrally with the first flange, a second end portion to which the second flange is bonded, and an outer peripheral surface on which a magnetic tape is wound,
the outer peripheral surface of the reel hub having
a first outer peripheral region expanding in diameter from the first end portion toward the second end portion, and
a second outer peripheral region expanding in diameter from the first outer peripheral region across the second end portion and forming a ridge line portion having a shape projecting radially outward of the reel hub on a boundary between the second outer peripheral region and the first outer peripheral region, wherein
a difference between an outer diameter of the ridge line portion and an outer diameter of the first end portion is 10 µm or more and 50 µm or less, and
a difference between the outer diameter of the first end portion and an outer diameter of the second end portion is 30 µm or more and 90 µm or less.

4. The tape reel according to claim 3, wherein
the first flange and the reel hub are a molded body of a composite material of a glass filler contained in a synthetic resin material.

5. The tape reel according to claim 4, wherein
the synthetic resin material is a polycarbonate resin, and the content of the glass filler is 10% or more and 20% or less in a weight ratio with respect to the polycarbonate resin.

6. An apparatus for producing a tape reel that includes the tape reel according to claim 3, comprising:
a first mold for molding the outer peripheral surface of the reel hub; and
a second mold for molding an inner peripheral surface of the reel hub,
the first mold having
a first molding surface configured by a tapered surface forming the first outer peripheral region, and
a second molding surface configured by a cylindrical surface forming the second outer peripheral region.

7. A tape reel, comprising:
a first flange;
a second flange; and
a reel hub that has a cylindrical shape and includes a first end portion formed integrally with the first flange, a second end portion to which the second flange is bonded, and an outer peripheral surface on which a magnetic tape is wound,
the outer peripheral surface of the reel hub having
a first outer peripheral region expanding in diameter from the first end portion toward the second end portion, and
a second outer peripheral region expanding in diameter from the first outer peripheral region across the second end portion and forming a ridge line portion having a shape projecting radially outward of the reel hub on a boundary between the second outer peripheral region and the first outer peripheral region, wherein
the reel hub has a height of approximately 13 mm, and
a length from the first end portion to the ridge line portion is 3 mm or more and 5 mm or less.

8. An apparatus for producing a tape reel that includes the tape reel according to claim 7, comprising:
a first mold for molding the outer peripheral surface of the reel hub; and
a second mold for molding an inner peripheral surface of the reel hub,
the first mold having
a first molding surface configured by a tapered surface forming the first outer peripheral region, and
a second molding surface configured by a cylindrical surface forming the second outer peripheral region.

9. A tape cartridge, comprising:
a tape reel that includes a first flange, a second flange, and a reel hub that has a cylindrical shape and includes a first end portion to be connected to the first flange, a second end portion to be connected to the second flange, and an outer peripheral surface on which a magnetic tape is wound,
the outer peripheral surface of the reel hub having
a first outer peripheral region expanding in diameter from the first end portion toward the second end portion, and
a second outer peripheral region expanding in diameter from the first outer peripheral region across the second end portion and forming a ridge line portion having a shape projecting radially outward of the reel hub on a boundary between the second outer peripheral region and the first outer peripheral region,
wherein the ridge line portion is located closer to the first end portion than a center of a height of the reel hub.

10. The tape cartridge according to claim 9, wherein
a radius difference between the first end portion and the second end portion after preserving the tape cartridge for one week in an environment of a temperature of 49° C. and a relative humidity of 80% while the magnetic tape is wound around the tape reel is 10 μm or less.

11. The tape cartridge according to claim 9, wherein
the magnetic tape has a thickness of 5.6 μm or less and a length of 960 m or more.

12. A tape cartridge, comprising:
a tape reel that includes a first flange, a second flange, and a reel hub that has a cylindrical shape and includes a first end portion to be connected to the first flange, a second end portion to be connected to the second flange, and an outer peripheral surface on which a magnetic tape is wound,
the outer peripheral surface of the reel hub having
a first outer peripheral region expanding in diameter from the first end portion toward the second end portion, and
a second outer peripheral region expanding in diameter from the first outer peripheral region across the second end portion and forming a ridge line portion having a shape projecting radially outward of the reel hub on a boundary between the second outer peripheral region and the first outer peripheral region,
wherein
a difference between an outer diameter of the ridge line portion and an outer diameter of the first end portion is 10 μm or more and 50 μm or less, and a difference between the outer diameter of the first end portion and an outer diameter of
the second end portion is 30 μm or more and 90 μm or less.

13. A tape cartridge, comprising:
a tape reel that includes a first flange, a second flange, and a reel hub that has a cylindrical shape and includes a first end portion to be connected to the first flange, a second end portion to be connected to the second flange, and an outer peripheral surface on which a magnetic tape is wound,
the outer peripheral surface of the reel hub having
a first outer peripheral region expanding in diameter from the first end portion toward the second end portion, and
a second outer peripheral region expanding in diameter from the first outer peripheral region across the second end portion and forming a ridge line portion having a shape projecting radially outward of the reel hub on a boundary between the second outer peripheral region and the first outer peripheral region,
wherein
the reel hub has a height of approximately 13 mm, and
a length from the first end portion to the ridge line portion is 3 mm or more and 5 mm or less.

* * * * *